US00RE48757E

(19) United States
(12) Reissued Patent
Fischer et al.

(10) Patent Number: US RE48,757 E
(45) Date of Reissued Patent: *Sep. 28, 2021

(54) DISTRIBUTED ANTENNA SYSTEM WITH COMBINATION OF BOTH ALL DIGITAL TRANSPORT AND HYBRID DIGITAL/ANALOG TRANSPORT

(71) Applicant: CommScope Technologies LLC, Hickory, NC (US)

(72) Inventors: Larry G. Fischer, Waseca, MN (US); Lance K. Uyehara, San Jose, CA (US)

(73) Assignee: CommScope Technologies LLC, Hickory, NC (US)

( * ) Notice: This patent is subject to a terminal disclaimer.

(21) Appl. No.: 16/215,391

(22) Filed: Dec. 10, 2018

Related U.S. Patent Documents

Reissue of:
(64) Patent No.: 8,532,242
Issued: Sep. 10, 2013
Appl. No.: 12/913,179
Filed: Oct. 27, 2010

U.S. Applications:
(63) Continuation of application No. 14/849,870, filed on Sep. 10, 2015, now Pat. No. Re. 47,160, which is an application for the reissue of Pat. No. 8,532,242.

(51) Int. Cl.
*H04B 7/26* (2006.01)
*H04B 1/40* (2015.01)
*H04B 7/022* (2017.01)

(52) U.S. Cl.
CPC ..... *H04B 7/2606* (2013.01); *H04B 1/40* (2013.01); *H04B 7/022* (2013.01)

(58) Field of Classification Search
CPC ..... H04B 7/2606; H04B 1/40; H04B 7/022
See application file for complete search history.

(56) References Cited

U.S. PATENT DOCUMENTS 4,183,054 A 1/1980 Patisaul et al.
4,451,916 A 5/1984 Casper et al.
(Continued)

FOREIGN PATENT DOCUMENTS

CA 2058736 7/1993
CA 2058736 A1 7/1993
(Continued)

OTHER PUBLICATIONS

"Tektronix Synchronous Optical Network (SONET)", "http://www.iec.org/online/tutorials/sonet/topic03.html", Aug. 28, 2002, pp. 1-5, Publisher: International Engineering Consortium.
(Continued)

*Primary Examiner* — Deandra M Hughes
(74) *Attorney, Agent, or Firm* — Fogg & Powers LLC

(57) ABSTRACT

A communication system includes master host unit, hybrid expansion unit, analog remote antenna unit, and digital remote antenna unit. Master host unit communicates analog signals with at least a first service provider interface using first bands of analog spectrum. Master host unit and hybrid expansion unit communicate first N-bit words of digitized spectrum over first digital link. Hybrid expansion unit converts between first N-bit words and second bands of analog spectrum. Hybrid expansion unit and analog remote antenna unit communicate second bands over analog medium. Analog remote antenna unit transmits and receives first plurality of wireless signals over air interfaces. Master host unit and digital remote antenna unit communicate second N-bit words of digitized spectrum over second digital link. Digital remote antenna unit converts between second N-bit words and third bands of analog spectrum. Digital remote antenna unit transmits and receives second wireless signals over air interfaces.

20 Claims, 14 Drawing Sheets

(56) References Cited

U.S. PATENT DOCUMENTS 4,611,323 A 9/1986 Hessenmuller
4,628,501 A 12/1986 Loscoe
4,654,843 A 3/1987 Roza et al.
4,691,292 A 9/1987 Rothweiler
4,999,831 A 3/1991 Grace
5,193,109 A 3/1993 Chien-Yeh Lee
5,243,598 A 9/1993 Lee
5,303,287 A 4/1994 Laborde
5,321,736 A 6/1994 Beasley
5,321,849 A 6/1994 Lemson
5,339,184 A 8/1994 Tang
5,377,255 A 12/1994 Beasley
5,381,459 A 1/1995 Lappington
5,400,391 A 3/1995 Emura et al.
5,461,627 A 10/1995 Rypinski
5,513,176 A * 4/1996 Dean ..... H01Q 21/29 370/335
5,519,691 A 5/1996 Darcie et al.
5,533,011 A 7/1996 Dean et al.
5,545,397 A 8/1996 Spielvogel et al.
5,566,168 A 10/1996 Dent
5,621,786 A 4/1997 Fischer et al.
5,627,879 A 5/1997 Russell et al.
5,634,191 A 5/1997 Beasley
5,642,405 A 6/1997 Fischer et al.
5,644,622 A 7/1997 Russell et al.
5,657,374 A 8/1997 Russell et al.
5,678,177 A 10/1997 Beasley
5,682,256 A 10/1997 Motley et al.
5,687,195 A 11/1997 Hwang et al.
5,732,076 A 3/1998 Ketseoglou et al.
5,761,619 A 6/1998 Danne et al.
5,765,099 A 6/1998 Georges et al.
5,781,541 A 7/1998 Schneider
5,781,859 A 7/1998 Beasley
5,802,173 A 9/1998 Hamilton-Piercy et al.
5,805,983 A 9/1998 Naidu et al.
5,809,395 A 9/1998 Hamilton-Piercy et al.
5,822,324 A 10/1998 Kostresti et al.
5,845,199 A 12/1998 Longshore
5,852,651 A 12/1998 Fischer et al.
5,867,485 A 2/1999 Chambers et al.
5,870,392 A 2/1999 Ann
5,890,055 A 3/1999 Chu et al.
5,907,544 A 5/1999 Rypinski
5,914,963 A 6/1999 Basile
5,924,022 A 7/1999 Beasley et al.
5,987,014 A 11/1999 Magill et al.
6,023,628 A 2/2000 Beasley
6,034,950 A 3/2000 Sauer et al.
6,108,113 A 8/2000 Fee
6,108,550 A 8/2000 Wiorek et al.
6,108,626 A 8/2000 Cellario et al.
6,157,659 A 12/2000 Bird
6,157,810 A 12/2000 Georges et al.
6,188,693 B1 2/2001 Murakami
6,222,660 B1 4/2001 Traa
6,226,274 B1 5/2001 Reese et al.
6,246,675 B1 6/2001 Beasley et al.
6,373,887 B1 4/2002 Aiyagari et al.
6,377,640 B2 4/2002 Trans
6,498,936 B1 12/2002 Raith
6,567,473 B1 5/2003 Tzannes
6,667,973 B1 12/2003 Gorshe et al.
6,674,966 B1 1/2004 Koonen
6,704,545 B1 * 3/2004 Wala ..... 455/16
6,729,929 B1 5/2004 Sayers et al.
6,757,553 B1 6/2004 English
6,768,745 B1 7/2004 Gorshe et al.
6,785,558 B1 8/2004 Stratford et al.
6,801,767 B1 10/2004 Schwartz et al.
6,807,374 B1 10/2004 Imajo et al.
6,826,163 B2 11/2004 Mani et al.
6,826,164 B2 11/2004 Mani et al.
6,831,901 B2 12/2004 Millar
6,865,390 B2 3/2005 Goss et al.
6,917,614 B1 7/2005 Laubach et al.
6,963,552 B2 11/2005 Sabat, Jr. et al. ..... H04W 16/14 370/338
7,127,175 B2 10/2006 Mani et al.
7,205,864 B2 4/2007 Schultz, Jr. et al.
7,215,651 B2 5/2007 Millar
7,289,972 B2 10/2007 Rieser et al.
7,313,415 B2 12/2007 Wake et al.
7,474,852 B1 1/2009 Jachetta et al.
7,733,901 B2 6/2010 Salkini et al.
7,761,093 B2 7/2010 Sabat, Jr. et al.
7,787,854 B2 8/2010 Conyers et al.
7,920,858 B2 4/2011 Sabat, Jr. et al.
8,027,270 B1 9/2011 Campana et al.
8,462,683 B2 6/2013 Uyehara et al.
8,472,579 B2 * 6/2013 Uyehara ..... H04J 3/0685 375/356
8,532,242 B2 9/2013 Fischer et al.
8,693,342 B2 4/2014 Uyehara et al.
8,837,659 B2 9/2014 Uyehara et al.
8,873,585 B2 * 10/2014 Oren ..... H04B 7/022 370/334
8,958,789 B2 * 2/2015 Bauman ..... H04B 10/25755 342/58
9,572,178 B1 * 2/2017 Seo ..... H04B 1/38
2001/0036163 A1 11/2001 Sabat, Jr. et al.
2001/0044292 A1 11/2001 Jeon et al.
2002/0075906 A1 6/2002 Cole et al.
2002/0142739 A1 10/2002 Smith
2002/0167954 A1 11/2002 Highsmith et al.
2002/0191565 A1 12/2002 Mani et al.
2003/0015943 A1 1/2003 Kim et al.
2003/0043928 A1 3/2003 Ling et al.
2003/0157943 A1 * 8/2003 Sabat, Jr. ..... H04B 7/2606 455/456.1
2003/0203717 A1 10/2003 Chuprun et al.
2004/0010609 A1 1/2004 Vilander et al.
2004/0032354 A1 2/2004 Knobel et al.
2004/0037565 A1 2/2004 Young et al. .... H04B 10/25752 398/115
2004/0053602 A1 3/2004 Wurzburg
2004/0106387 A1 6/2004 Bauman et al. ..... H04W 52/42 455/232.1
2004/0106435 A1 6/2004 Bauman et al.
2004/0132474 A1 7/2004 Wala
2004/0198453 A1 10/2004 Cutrer et al.
2004/0203339 A1 10/2004 Bauman ..... H04B 7/0842 455/7
2004/0203703 A1 10/2004 Fischer ..... H04W 88/085 455/422.1
2004/0219950 A1 11/2004 Pallonen et al. ..... H01Q 1/246 455/562.1
2005/0147067 A1 7/2005 Mani et al.
2005/0201323 A1 9/2005 Mani et al.
2005/0250503 A1 11/2005 Cutrer
2005/0250541 A1 11/2005 Bird et al.
2006/0026017 A1 2/2006 Walker
2006/0066484 A1 3/2006 Sayers
2006/0094470 A1 * 5/2006 Wake et al. ..... 455/562.1
2006/0121944 A1 6/2006 Buscaglia et al.
2006/0153070 A1 7/2006 DelRegno et al.
2006/0172775 A1 8/2006 Conyers et al.
2006/0193295 A1 8/2006 White et al.
2007/0008939 A1 1/2007 Fischer ..... H04W 88/085 370/338
2007/0147278 A1 6/2007 Millar
2008/0181282 A1 7/2008 Wala et al.
2008/0192855 A1 8/2008 Shapira et al.
2008/0240164 A1 10/2008 Zavadsky
2009/0061940 A1 3/2009 Scheinert et al.
2009/0067363 A1 3/2009 Ruiz et al.
2009/0180407 A1 7/2009 Sabat et al.
2009/0207942 A1 8/2009 Lin et al.
2009/0316608 A1 12/2009 Singh et al.
2009/0316611 A1 * 12/2009 Stratford ..... H04J 3/0608 370/294
2010/0046494 A1 2/2010 Palanki et al.

(56) References Cited

U.S. PATENT DOCUMENTS

| | | | | |
|---|---|---|---|---|
| 2010/0093391 | A1 | 4/2010 | Saban et al. | |
| 2010/0215028 | A1 | 8/2010 | Fischer | |
| 2011/0143649 | A1 | 6/2011 | Sabat, Jr. et al. | |
| 2011/0237182 | A1* | 9/2011 | Stratford | H04W 52/52 455/7 |
| 2011/0243291 | A1 | 10/2011 | McAllister et al. | |
| 2011/0280209 | A1 | 11/2011 | Wegener | |
| 2012/0027145 | A1 | 2/2012 | Uyehara et al. | |
| 2012/0281622 | A1 | 11/2012 | Saban et al. | |
| 2013/0017863 | A1 | 1/2013 | Kummetz et al. | |
| 2013/0272463 | A1 | 10/2013 | Uyehara et al. | |

FOREIGN PATENT DOCUMENTS

| | | | |
|---|---|---|---|
| CA | 2058737 | | 7/1993 |
| CA | 2069462 | | 7/1993 |
| CA | 2069462 | A1 | 7/1993 |
| CA | 2087285 | | 1/1994 |
| CA | 2138763 | | 1/1994 |
| CA | 2138763 | A1 | 1/1994 |
| CA | 2156046 | | 1/1995 |
| CA | 2156046 | A1 | 1/1995 |
| CA | 2125411 | | 5/1995 |
| CA | 2125411 | C | 5/1995 |
| CA | 2128842 | | 1/1996 |
| CA | 2128842 | A1 | 1/1996 |
| CA | 2134365 | | 4/1996 |
| CA | 2134365 | A1 | 4/1996 |
| CA | 2058737 | | 3/1997 |
| CA | 2158386 | | 3/1997 |
| CA | 2158386 | A1 | 3/1997 |
| CA | 2168681 | | 8/1997 |
| CA | 2168681 | A1 | 8/1997 |
| CA | 2215079 | | 3/1999 |
| CA | 2215079 | A1 | 3/1999 |
| CN | 1455993 | A | 11/2003 |
| CN | 1719761 | A | 1/2006 |
| CN | 101018064 | A | 8/2007 |
| CN | 101283551 | A | 10/2008 |
| CN | 101355778 | A | 1/2009 |
| CN | 100466494 | | 3/2009 |
| CN | 102084606 | A | 6/2011 |
| CN | 102084614 | A | 6/2011 |
| EP | 0391597 | | 10/1990 |
| EP | 0391597 | A2 | 10/1990 |
| EP | 0876073 | | 11/1998 |
| EP | 0876073 | A2 | 11/1998 |
| EP | 0935385 | A2 | 8/1999 |
| EP | 1214809 | | 3/2006 |
| EP | 1214809 | B1 | 3/2006 |
| EP | 2599240 | B1 | 12/2014 |
| EP | 2852071 | A2 | 3/2015 |
| GB | 2253770 | | 9/1992 |
| GB | 2253770 | A | 9/1992 |
| GB | 2289198 | | 11/1995 |
| GB | 2289198 | A | 11/1995 |
| GB | 2315959 | | 2/1998 |
| GB | 2315959 | A | 2/1998 |
| GB | 2320653 | | 6/1998 |
| GB | 2320653 | A | 6/1998 |
| JP | 2000333240 | | 11/2000 |
| JP | 2000333240 | A | 11/2000 |
| JP | 2001197012 | | 7/2001 |
| JP | 2001197012 | A | 7/2001 |
| JP | 2003023396 | | 1/2003 |
| JP | 2003023396 | A | 1/2003 |
| JP | 2004180220 | | 6/2004 |
| JP | 2004180220 | A | 6/2004 |
| JP | 2004194351 | | 7/2004 |
| JP | 2004194351 | A | 7/2004 |
| KR | 1020080015462 | | 2/2008 |
| KR | 1020090113369 | | 10/2009 |
| KR | 1020100011297 | | 2/2010 |
| KR | 1020100080062 | | 7/2010 |
| WO | 9115927 | | 10/1991 |
| WO | 9115927 | A1 | 10/1991 |
| WO | 9413067 | | 6/1994 |
| WO | 9413067 | A1 | 6/1994 |
| WO | 9533350 | | 12/1995 |
| WO | 9533350 | A1 | 12/1995 |
| WO | 9628946 | | 9/1996 |
| WO | 9628946 | A1 | 9/1996 |
| WO | 9716000 | | 5/1997 |
| WO | 9716000 | A1 | 5/1997 |
| WO | 9732442 | | 9/1997 |
| WO | 9732442 | A1 | 9/1997 |
| WO | 9824256 | | 6/1998 |
| WO | 9824256 | A2 | 6/1998 |
| WO | 9937035 | | 7/1999 |
| WO | 9937035 | A1 | 7/1999 |
| WO | 0117156 | | 3/2001 |
| WO | 0117156 | A1 | 3/2001 |
| WO | 0174013 | | 10/2001 |
| WO | 0174013 | A2 | 10/2001 |
| WO | 0174100 | | 10/2001 |
| WO | 0174100 | A1 | 10/2001 |
| WO | 0182642 | | 11/2001 |
| WO | 0182642 | A1 | 11/2001 |
| WO | 0209319 | A1 | 1/2002 |
| WO | 03079645 | | 9/2003 |
| WO | 03079645 | A2 | 9/2003 |
| WO | 2006135697 | A1 | 12/2006 |
| WO | 2007075579 | A2 | 7/2007 |
| WO | 2008092067 | A2 | 7/2008 |
| WO | 2009012448 | A2 | 1/2009 |
| WO | 2009138876 | A2 | 11/2009 |
| WO | 2009151893 | A2 | 12/2009 |
| WO | 2009155602 | A1 | 12/2009 |
| WO | 2012015892 | A2 | 2/2012 |

OTHER PUBLICATIONS

Canadian Intellectual Property Office, "Notice of Allowance from CA Application No. 2,815,509 dated Jun. 12, 2014", "from Foreign Counterpart of U.S. Appl. No. 12/913,179", Jun. 12, 2014, p. 1, Published in: CA.

Chinese Patent Office, "First Office Action for CN Application No. 201180063065.5", "from Foreign Counterpart to U.S. Appl. No. 12/913,179", Apr. 21, 2015, pp. 1-14, Published in: CN.

Canadian Intellectual Property Office, "Office Action for CA Application No. 2,803,013", "Foreign Counterpart from U.S. Appl. No. 12/845,060", dated Jun. 1, 2017, pp. 14, Published in: CA.

Canadian Patent Office, "Office Action for CA Application No. 2,815,509", "from Foreign Counterpart to U.S. Appl. No. 12/913,179", dated Sep. 30, 2013, pp. 12, Published in: CA.

European Patent Office, "Office Action from EP Application No. 06772594.5 dated Apr. 14, 2008", "from Foreign Counterpart of U.S. Appl. No. 11/150,820", filed Apr. 14, 2008, pp. 1-7, Published in: EP.

European Patent Office, "Communication pursuant to Article 94(3) from EP Application No. 14003681.5", "from Foreign Counterpart to U.S. Appl. No. 12/845,060", dated Mar. 9, 2016, pp. 1-6, Published in: EP.

European Patent Office, "Communication pursuant to Rule 161(2) and 162 EPC for EP Application No. 11813094.7", "from Foreign Counterpart to U.S. Appl. No. 12/845,060", dated Mar. 15, 2013, pp. 1-2, Published in: EP.

European Patent Office, "Communication pursuant to Rules 161(2) and 162 for EP Application No. 11836933.9", "from Foreign Counterpart to U.S. Appl. No. 12/913,179", dated Jun. 21, 2013, pp. 1-2, Published in: EP.

European Patent Office, "Communication pursuant to Rules 70(2) and 70a(2) EPC for EP Application No. 11813094.7", "from Foreign Counterpart to U.S. Appl. No. 12/845,060", dated Aug. 30, 2013, p. 1 Published in: EP.

European Patent Office, "Communication under Rule 71(3) for EP Application No. 06772594.5 dated Aug. 6, 2012", "Foreign Counterpart to U.S. Appl. No. 11/150,820", filed Aug. 6, 2012, pp. 1-6, Published in: EP.

(56) References Cited

OTHER PUBLICATIONS

European Patent Office, "Communication under Rule 71(3) from EP Application No. 06772594.5 dated Sep. 13, 2012", from Foreign Counterpart to U.S. Appl. No. 11/150,820, pp. 1-40, Published: EP.
European Patent Office, "Communication under Rule 71(3) from EP Application No. 11836933.9 dated Sep. 13, 2018", from Foreign Counterpart to U.S. Appl. No. 12/913,179, filed Sep. 13, 2018, pp. 1-72, Published: EP.
European Patent Office, "Communication under Rule 71(3) for EP Application No. 11813094.7", "from Foreign Counterpart to U.S. Appl. No. 12/845,060", dated Jul. 8, 2014, pp. 1-45, Published in: EP.
European Patent Office, "Decision Revoking the Patent from EP Application No. 11813094.7", "from Foreign Counterpart of U.S. Appl. No. 12/845,060", dated Dec. 8, 2017, pp. 1-17, Published in: EP.
European Patent Office, "European Search Report for EP Application No. 14003681.5", "from Foreign Counterpart to U.S. Appl. No. 12/845,060", dated Apr. 7, 2015, pp. 1-4, Published in: EP.
European Patent Office, "Extended European Search Report for Application No. 11836933.9", "from Foreign Counterpart to U.S. Appl. No. 12/913,179", dated Oct. 21, 2015, pp. 1-9, Published in: US.
European Patent Office, "Extended European Search Report from EP Application No. 19159426.6 dated Jun. 13, 2019", from Foreign Counterpart to U.S. Appl. No. 12/913,179, pp. 1-12, Published: EP.
European Patent Office, "Extended European Search Report from EP Application No. 11813094.7 dated Aug. 14, 2013", "from Foreign Counterpart of U.S. Appl. No. 12/845,060", Aug. 14, 2013, pp. 16, Published in: EP.
European Patent Office, "Minutes of EP Oral Proceedings from EP Application No. 11813094.7", "from Foreign Counterpart of U.S. Appl. No. 12/845,060", dated Dec. 8, 2017, pp. 1-6, Published in: EP.
European Patent Office, "Notice of Opposition for EP Application No. 11813094.7", "from Foreign Counterpart to U.S. Appl. No. 12/845,060", Sep. 28, 2015, pp. 1-96, Published in: EP.
European Patent Office, "Notice of Opposition for EP Application No. 11813094.7", "from Foreign Counterpart to U.S. Appl. No. 12/845,060", dated Oct. 22, 2015, p. 1 Published in: EP.
European Patent Office, "Office Action from EP Application No. 06772594.5 dated Oct. 5, 2009", "from Foreign Counterpart of U.S. Appl. No. 11/150,820", filed Oct. 5, 2009, pp. 1-3, Published in: EP.
European Patent Office, "Office Action from EP Application No. 06772594.5 dated Nov. 3, 2011", "from Foreign Counterpart of U.S. Appl. No. 11/150,820", filed Nov. 3, 2011, pp. 1-3, Published in: EP.
European Patent Office, "Office Action from EP Application No. 06772594.5 dated Nov. 12, 2010", "from Foreign Counterpart of U.S. Appl. No. 11/150,820", filed Nov. 12, 2010, pp. 1-5, Published in: EP.
European Patent Office, "Summons to Attend Oral Proceedings for EP Application No. 11813094.7", "from U.S. Appl. No. 12/845,060", dated Jan. 11, 2017, pp. 1-20, Published in: EP.
European Patent Office, "Summons to Oral Proceedings in Examination Procedure for EP Application No. 14003681.5", "Foreign Counterpart to U.S. Appl. No. 12/845,060", dated Jan. 24, 2018, pp. 1-11, Published in: EP.
International Preliminary Examining Authority, "International Preliminary Report on Patentability from 'PCT Application No. PCT/US2011/057575 dated May 10, 2013", "from Foreign Counterpart of U.S. Appl. No. 12/913,179", May 10, 2013, pp. 1-7, Published in: WO.
International Preliminary Examining Authority, "International Preliminary Report on Patentability from PCT Application No. PCT/US2006/022342 dated Dec. 27, 2007", "from Foreign Counterpart of U.S. Appl. No. 11/150,820", filed Dec. 27, 2007, pp. 1-9, Published in: WO.
International Preliminary Examining Authority, "International Preliminary Report on Patentability from PCT Application No. PCT/US2011/045495 dated Feb. 7, 2013", "from Foreign Counterpart of U.S. Appl. No. 12/845,060", filed Feb. 7, 2013, pp. 1-6, Published in: WO.
International Searching Authority, "International Search Report and Written Opinion from PCT Application No. PCT/US2006/022342 dated Nov. 7, 2006", "from Foreign Counterpart of U.S. Appl. No. 11/150,820", filed Nov. 7, 2006, pp. 1-13, Published in: WO.
International Searching Authority, "International Search Report and Written Opinion from PCT Application No. PCT/US2011/045495 dated Feb. 17, 2012", "from Foreign Counterpart of U.S. Appl. No. 12/845,060", filed Feb. 17, 2012, pp 1-9, Published in: WO.
International Searching Authority, "International Search Report and Written Opinion from PCT Application No. PCT/US2011/057575 dated Feb. 17, 2012", from Foreign Counterpart to U.S. Appl. No. 12/913,179, pp. 1-10, Published: WO.
Japan Patent Office, "Decision of Final Rejection from JP Application No. 2008-515931 dated Feb. 28, 2012", "from Foreign Counterpart of U.S. Appl. No. 11/150,820", filed Feb. 28, 2012, pp. 1-8, Published in: JP.
Japan Patent Office, "Notification of Reasons for Rejection from JP Application No. 2008-515931 dated Nov. 1, 2011", "from Foreign Counterpart of U.S. Appl. No. 11/150,820", filed Nov. 1, 2011, pp. 1-10, Published in: JP.
Korean Patent Office, "Decision to Grant for KR Application No. 10-2014-7017490", "from foreign counterpart to U.S. Appl. No. 12/913,179", filed Feb. 1, 2017, pp. 1-6, Published in: KR.
Korean Patent Office, "Decision to Grant for Application No. 2013-7013076", "from Foreign Counterpart to U.S. Appl. No. 12/913,179", filed Aug. 21, 2014, pp. 1-3, Published in: KR.
Korean Patent Office, "Office Action for KR Application No. 10-2014-7017490", "from Foreign Counterpart to U.S. Appl. No. 12/913,179", filed Nov. 16, 2016, pp. 1-5, Published in: KR.
Korean Intellectual Property Office, "Office Action from KR Application No. 2013-7013076 dated Mar. 26, 2014", "from Foreign Counterpart of U.S. Appl. No. 12/913,179", filed Mar. 26, 2014, pp. 1-6, Published in: KR.
Korean Patent Office, "Decision to Grant for Korean Patent Application No. 2007/7030470", "from Foreign Counterpart to U.S. Appl. No. 11/150,820", filed Jul. 17, 2013, pp. 1-6, Published in: KR.
Korean Patent Office, "Decision to Grant for Korean Patent Application No. 2012-7034310", "from Foreign Counterpart to U.S. Appl. No. 12/845,060", filed Jan. 27, 2014, pp. 1-6, Published in: KR.
Korean Patent Office, "Office Action from KR Application No. 2007-7030470 dated Sep. 17, 2012", "from Foreign counterpart of U.S. Appl. No. 11/150,820", filed Sep. 17, 2012, pp. 1-5, Published in: KR.
National Intellectual Property Administration, P.R. China, "Notification to Grant Patent Right for Invention from CN Application No. 201610670195.X dated Jun. 28, 2019", from Foreign Counterpart to U.S. Appl. No. 12/913,179, pp. 1-4, Published: CN.
National Intellectual Property Administration, P.R. China, "Second Office Action from CN Application No. 201610670195.X dated Feb. 15, 2019", from Foreign Counterpart to U.S. Appl. No. 12/913,179, pp. 1-18, Published: CN.
Spectracom, "White Paper: A Master Clock Approach to Distributing Precision Time and Frequency", "https://spectracom.com/sites/default/files/document-files/Time_and_Frequency_Distribution_WP11-101_A.pdf", Jan. 31, 2014, pp. 1-5, Publisher: Spectracom.
State Intellectual Property Office, "First Office Action for CN Application No. 201610144515.8", from Foreign Counterpart of U.S. Appl. No. 12/845,060, dated Oct. 10, 2017, pp. 1-11, Published in: CN.
State Intellectual Property Office, P.R. China, "Notification to Grant Patent Right for Invention from CN Application No. 201180063065.5 dated May 31, 2016", from Foreign Counterpart to U.S. Appl. No. 12/913,179, pp. 1-5, Published: CN.
U.S. Patent and Trademark Office, File History from U.S. Appl. No. 12/913,179, 1866 Pages, Published: US.

(56) References Cited

OTHER PUBLICATIONS

U.S. Patent and Trademark Office, "Advisory Action", U.S. Appl. No. 15/448,315, dated Nov. 19, 2019, pp. 1-4, Published: US.
U.S. Patent and Trademark Office, "Office Action", U.S. Appl. No. 15/448,315, dated Feb. 26, 2020, pp. 1-62, Published: US.
U.S. Patent and Trademark Office, "Office Action", U.S. Appl. No. 14/849,870, dated Jul. 21, 2017, pp. 1-58, Published: US.
U.S. Patent and Trademark Office, "Final Office Action", U.S. Appl. No. 14/849,870, dated Dec. 12, 2017, pp. 1-10, Published: US.
U.S. Patent and Trademark Office, "Notice of Allowance", U.S. Appl. No. 14/849,870, dated May 22, 2018, pp. 1-18, Published: US.
U.S. Patent and Trademark Office, "Office Action", U.S. Appl. No. 15/448,315, dated Dec. 31, 2018, pp. 1-10, Published: US.
U.S. Patent and Trademark Office, "Final Office Action", U.S. Appl. No. 15/448,315, dated Nov. 5, 2019, pp. 1-11, Published: US.
U.S. Patent and Trademark Office, "Interview Summary", U.S. Appl. No. 11/150,820, dated Dec. 11, 2007, p. 1, Published: US.
Chinese Patent Office, "First Office Action for CN Application No. 201180036792.2", "from Foreign Counterpart to U.S. Appl. No. 12/845,060", dated Mar. 3, 2015, pp. 1-25, Published in: CN.
Chinese Patent Office, "First Office Action from CN Application No. 200680029629.2 dated Oct. 9, 2010", "from Foreign Counterpart of U.S. Appl. No. 11/150,820", filed Oct. 9, 2010, pp. 1-33, Published in: CN.
State Intellectual Property Office, P.R. China, "First Office Action from CN Application No. 201210153142.2 dated Feb. 25, 2014", "from Foreign Counterpart of U.S. Appl. No. 11/150,820", filed Feb. 25, 2014, pp. 1-31, Published in: CN.
State Intellectual Property Office, People'S Republic of China, "First Office Action from CN Application No. 201610670195.X dated May 25, 2018", from Foreign Counterpart of U.S. Appl. No. 12/913,179; pp. 1-10; Published in China.
State Intellectual Property Office, P.R. China, "Notification of Correction of Notice of Patent Right for Invention from CN Application No. 201210153142.2 dated Jul. 10, 2015", from Foreign Counterpart to U.S. Appl. No. 11/150,820, filed Jul. 10, 2015, pp. 1-4, Published: CN.
Chinese Patent Office, "Notification to Grant for China Application No. 201210153142.2", "from Foreign Counterpart to U.S. Appl. No. 11/150,820", dated Jul. 2, 2015, pp. 1-5, Published in: CN.
State Intellectual Property Office, P.R. China, "Notification to Grant Patent Right for CN Application No. 201180036792.2", "from Foreign Counterpart to U.S. Appl. No. 12/845,060", dated Dec. 30, 2015, pp. 1-5, Published in: CN.
Chinese Patent Office, "Notification to Grant Patent Right for Invention from CN Application No. 200680029629.2 dated Mar. 2, 2012", "from Foreign Counterpart of U.S. Appl. No. 11/150,820", filed Mar. 2, 2012, pp. 1-4, Published in: CN.
State Intellectual Property Office, P.R. China, "Search Report from CN Application No. 201180063065.5 dated Dec. 1, 2015", from Foreign Counterpart to U.S. Appl. No. 12/913,179, pp. 1-2, Published: CN.
China Patent Office, "Second Office Action for Chinese Patent Application U.S. Appl. No. 201210153142.2", "from Foreign Counterpart to U.S. Appl. No. 11/150,820", dated Oct. 24, 2014, pp. 1-7, Published in: CN.
State Intellectual Property Office, P.R. China, "Second Office Action for CN Application No. 201180036792.2", "from Foreign Counterpart to U.S. Appl. No. 12/845,060", dated Aug. 28, 2015, pp. 1-22, Published in: CN.
Chinese Patent Office, "Second Office Action from CN Application No. 200680029629.2 dated Aug. 10, 2011", "from Foreign Counterpart of U.S. Appl. No. 11/150,820", filed Aug. 10, 2011, pp. 1-31, Published in: CN.
State Intellectual Property Office, P.R. China, "Second Office Action from CN Application No. 201180063065.5 dated Dec. 9, 2015", from Foreign Counterpart to U.S. Appl. No. 12/913,179, pp. 1-9, Published: CN.
Chinese Patent Office, "Third Office Action from CN Application No. 200680029629.2 dated Nov. 16, 2011", "from Foreign Counterpart of U.S. Appl. No. 11/150,820", filed Nov. 16, 2011, pp. 1-10, Published in: CN.
U.S. Patent and Trademark Office, "Advisory Action", U.S. Appl. No. 11/150,820, dated Apr. 30, 2014, pp. 1-3, Published: US.
U.S. Patent and Trademark Office, "Corrected Notice of Allowability and Interview Summary", "U.S. Appl. No. 12/845,060", date dMar. 28, 2013, pp. 1-25.
U.S. Patent and Trademark Office, "Decision on Appeal", "U.S. Appl. No. 11/150,820", dated Nov. 19, 2012, pp. 1-6.
U.S. Patent and Trademark Office, "Decision on Appeal", "from U.S. Appl. No. 11/150,820", dated Jul. 6, 2016, pp. 1-10, Published in: US.
U.S. Patent Office, "Decision on Appeal", "from U.S. Appl. No. 12/775,897", dated Sep. 2, 2015, pp. 1-12, Published in: US.
U.S. Patent and Trademark Office, "Decision on Request for Rehearing for U.S. Appl. No. 11/150,820", dated Dec. 29, 2016, pp. 1-8, Published in: US.
U.S. Patent and Trademark Office, "Decision on Request for Rehearing", "from U.S. Appl. No. 12/775,897", dated Jan. 6, 2016, pp. 1-13, Published in: US.
U.S. Patent Office, "Examiner's Answer", "from U.S. Appl. No. 11/150,820", dated Nov. 4, 2014, pp. 1-31.
U.S. Patent and Trademark Office, "Examiner's Answer", "U.S. Appl. No. 11/150,820", dated Nov. 17, 2009, pp. 1-24.
U.S. Patent and Trademark Office, "Examiner's Answer", "U.S. Appl. No. 12/775,897", dated Jan. 4, 2013, pp. 1-30.
U.S. Patent and Trademark Office, "Final Office Action", "U.S. Appl. No. 11/150,820", dated Dec. 29, 2008, pp. 1-27.
U.S. Patent and Trademark Office, "Final Office Action", "U.S. Appl. No. 11/150,820", dated Sep. 27, 2007, pp. 1-25.
U.S. Patent and Trademark Office, "Final Office Action", "from U.S. Appl. No. 11/150,820", dated Feb. 6, 2014, pp. 1-20, Published in: US.
U.S. Patent and Trademark Office, "Final Office Action", "U.S. Appl. No. 12/775,897", dated May 7, 2012, pp. 1-26.
U.S. Patent and Trademark Office, "Pre-Appeal Brief Decision", "U.S. Appl. No. 12/775,897", dated Sep. 18, 2012, pp. 1-2.
U.S. Patent and Trademark Office, "Pre-Appeal Brief Decision", "from U.S. Appl. No. 11/150,820"dated Jun. 19, 2014, pp. 1-2, Published in: US.
U.S. Patent and Trademark Office, "Notice of Allowance for U.S. Appl. No. 15/268,453", dated Apr. 12, 2018, pp. 1-74, Published in: US.
U.S. Patent and Trademark Office, "Notice of Allowance", "U.S. Appl. No. 12/845,060", dated Mar. 4, 2013, pp. 1-10.
U.S. Patent and Trademark Office, "Notice of Allowance", "from U.S. Appl. No. 13/914,838", dated May 15, 2014, pp. 1-16, Published in: US.
U.S. Patent Office, "Office Action", "from U.S. Appl. No. 11/150,820", dated Sep. 6, 2013, pp. 1-31.
U.S. Patent and Trademark Office, "Office Action", "Application U.S. Appl. No. 11/150,820", dated Mar. 16, 2007, pp. 1-21.
U.S. Patent and Trademark Office, "Office Action", "U.S. Appl. No. 11/150,820", dated Mar. 24, 2008, pp. 1-17.
U.S. Patent and Trademark Office, "Office Action", "U.S. Appl. No. 12/775,897", dated Dec. 28, 2011, pp. 1-29.
U.S. Patent and Trademark Office, "Office Action", "U.S. Appl. No. 12/845,060", dated Oct. 2, 2012, pp. 1-28.
U.S. Patent and Trademark Office, "Office Action", "from U.S. Appl. No. 13/914,838", dated Nov. 20, 2013, pp. 1-47, Published in: US.
U.S. Patent and Trademark Office, "Final Office Action", U.S. Appl. No. 15/448,315, dated Sep. 5, 2019, pp. 1-11, Published: US.
Andrew Wireless Solutions, "ION Series IONTM—B Series", at least as early as Feb. 26, 2008, pp. 1 trough 4, CommScope.
"Flexwave Spectrum One Solution for Your Wireless Services", at least as early as Dec. 12, 2014, pp. 1 through 8, TE Connectivity Ltd.
"InterReach Spectrum", at least as early as Sep. 12, 2011, pp. 1 through 12, GraybaR, TE Connectivity Ltd.

(56) References Cited

OTHER PUBLICATIONS

U.S. Patent and Trademark Office, "Notice of Allowance from U.S. Appl. No. 16/277,816, dated Jun. 26, 2020"; pp. 1 through 64; Published: US.
U.S. Patent and Trademark Office, "Notice of Allowance from U.S. Appl. No. 15/268,453 dated Jun. 25, 2020", pp. 1 through 63; Published: US.
U.S. Patent and Trademark Office, "Final Office Action", U.S. Appl. No. 15/448,315, dated Sep. 3, 2020, pp. 1 through 23, Published: US.
U.S. Patent and Trademark Office, "Office Action", U.S. Appl. No. 15/448,315, dated Mar. 18, 2021, pp. 1 through 21, Published: US.
Uyehara, U.S. Appl. No. 12/845,060, filed Jul. 28, 2010, entitled "Distributed Digital Reference Clock", pp. 1-37, Published in: US.
"DigivanceTM, Indoor Coverage Solution", "www.adc.com", 2001, pp. 1-8, Publisher: ADC.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
U.S. Patent and Trademark Office, "Notice of Allowance", "U.S. Appl. No. 12/845,060", Mar. 4, 2013, pp. 1-10.
U.S. Patent and Trademark Office, "Corrected Notice of Allowability and Interview Summary", "U.S. Appl. No. 12/845,060", Mar. 28, 2013, pp. 1-25.
U.S. Patent and Trademark Office, "Office Action", "U.S. Appl. No. 12/845,060", Oct. 2, 2012, pp. 1-28.
International Preliminary Examining Authority, "International Preliminary Report on Patentability", "from Foreign Counterpart of U.S. Appl. No. 12/845,060", Feb. 7, 2013, pp. 1-6, Published in: WO.
Chinese Patent Office, "Notification to Grant Patent Right for Invention", "from Foreign Counterpart of U.S. Appl. No. 11/150,820", Mar. 2, 2012, pp. 1-4, Published in: CN.
Chinese Patent Office, "Third Office Action", "from Foreign Counterpart of U.S. Appl. No. 11/150,820", Nov. 16, 2011, pp. 1-10, Published in: CN.
European Patent Office, "Communication under Rule 71(3) EPC", "from Foreign Counterpart of U.S. Appl. No. 11/150,820", Sep. 13, 2012, pp. 1-40.
European Patent Office, "Office Action", "from Foreign Counterpart of U.S. Appl. No. 11/150,820", Oct. 5, 2009, pp. 1-3, Published in: EP.
European Patent Office, "Office Action", "from Foreign Counterpart of U.S. Appl. No. 11/150,820", Nov. 12, 2010, pp. 1-5, Published in: EP.
European Patent Office, "Office Action", "from Foreign Counterpart of U.S. Appl. No. 11/150,820", Nov. 3, 2011, pp. 1-3, Published in: EP.
Japan Patent Office, "Notification of Reasons for Rejection", "from Foreign Counterpart of U.S. Appl. No. 11/150,820", Nov. 1, 2011, pp. 1-10, Published in: JP.
Japan Patent Office, "Decision of Final Rejection", "from Foreign Counterpart of U.S. Appl. No. 11/150,820", Feb. 28, 2012, pp. 1-8, Published in: JP.
Korean Patent Office, "Office Action", "from Foreign Counterpart of U.S. Appl. No. 11/150,820", Sep. 17, 2012, pp. 1-5, Published in: KR.
U.S. Patent and Trademark Office, "Decision on Appeal", "U.S. Appl. No. 11/150,820", Nov. 19, 2012, pp. 1-6.
U.S. Patent and Trademark Office, "Examiner's Answer", "U.S. Appl. No. 11/150,820", Nov. 17, 2009, pp. 1-24.
U.S. Patent and Trademark Office, "Final Office Action", "U.S. Appl. No. 11/150,820", Sep. 27, 2007, pp. 1-25.
U.S. Patent and Trademark Office, "Final Office Action", "U.S. Appl. No. 11/150,820", Dec. 29, 2008, pp. 1-27.
U.S. Patent and Trademark Office, "Office Action", "U.S. Appl. No. 11/150,820", Mar. 16, 2007, pp. 1-21.
U.S. Patent and Trademark Office, "Office Action", "U.S. Appl. No. 11/150,820", Mar. 24, 2008, pp. 1-17.
U.S. Patent and Trademark Office, "Examiner's Answer", "U.S. Appl. No. 12/775,897", Jan. 4, 2013, pp. 1-30.
U.S. Patent and Trademark Office, "Final Office Action", "U.S. Appl. No. 12/775,897", May 7, 2012, pp. 1-26.
U.S. Patent and Trademark Office, "Office Action", "U.S. Appl. No. 12/775,897", Dec. 28, 2011, pp. 1-29.
U.S. Patent and Trademark Office, "Pre-Appeal Brief Decision", "U.S. Appl. No. 12/775,897", Sep. 18, 2012, pp. 1-2.
International Preliminary Examining Authority, "International Preliminary Report on Patentability", "from Foreign Counterpart of U.S. Appl. No. 11/150,820", Dec. 27, 2007, pp. 1-9, Published in: WO.

* cited by examiner

DISTRIBUTED ANTENNA SYSTEM WITH COMBINATION OF BOTH ALL DIGITAL TRANSPORT AND HYBRID DIGITAL/ANALOG TRANSPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 8,532,242. The reissue applications are reissue application Ser. No. 14/849,870 filed Sep. 10, 2015 and this continuation reissue Application Ser. No. (the present continuation reissue application). Both reissue applications are reissues of the same issued U.S. Pat. No. 8,532,242 (application Ser. No. 12/913,179 filed Oct. 27, 2010).* The present application is related to commonly assigned and co-pending U.S. patent application Ser. No. 11/150,820 (hereafter "the '820 application") entitled "PROVIDING WIRELESS COVERAGE INTO SUBSTANTIALLY CLOSED ENVIRONMENTS", filed on Jun. 10, 2005 (currently pending). The present application is also related to commonly assigned and co-pending U.S. patent application Ser. No. 12/775,897 (hereafter "the '897 application") entitled "PROVIDING WIRELESS COVERAGE INTO SUBSTANTIALLY CLOSED ENVIRONMENTS", filed on May 7, 2010 (currently pending). The present application is also related to commonly assigned and co-pending U.S. patent application Ser. No. 12/845,060 (hereafter "the '060 application") entitled "DISTRIBUTED DIGITAL REFERENCE CLOCK", filed Jul. 28, 2010 (currently pending). The '820 application, the '897 application, and the '060 application are all incorporated herein by reference in their entirety.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antennas have been implemented in the art.

SUMMARY

A communication system includes a master host unit, a first hybrid expansion unit coupled to the master host unit by a first digital communication link, a first analog remote antenna unit coupled to the first hybrid expansion unit by a first analog communication link, and a first digital remote antenna unit coupled to the master host unit by a second digital communication link. The master host unit is adapted to communicate analog signals with at least a first service provider interface using a first set of bands of analog spectrum. The master host unit and the first hybrid expansion unit are adapted to communicate first N-bit words of digitized spectrum over the first digital communication link.

The first hybrid expansion unit is further adapted to convert between the first N-bit words of digitized spectrum and a second set of bands of analog spectrum. The first hybrid expansion unit and the first analog remote antenna unit are adapted to communicate the second set of bands of analog spectrum over the analog communication medium. The first analog remote antenna unit is further adapted to transmit and receive a first plurality of wireless signals over a first plurality of air interfaces. The master host unit and the first digital remote antenna unit are adapted to communicate second N-bit words of digitized spectrum over the second digital communication link. The first digital remote antenna unit is further adapted to convert between the second N-bit words of digitized spectrum and a third set of bands of analog spectrum. The first digital remote antenna unit if further adapted to transmit and receive second wireless signals over a second plurality of air interfaces.

DRAWINGS

DETAILED DESCRIPTION

Figure 1:
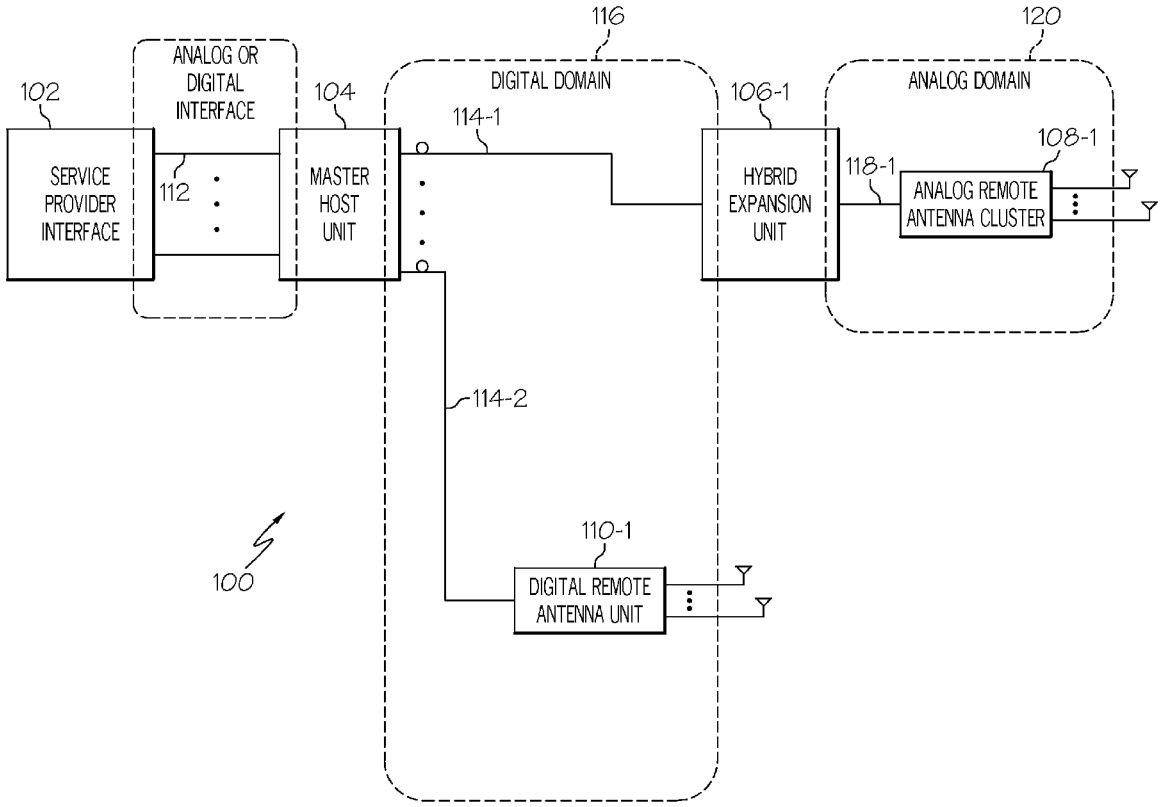
FIG. 1 is a block diagram of one embodiment of a system for providing wireless coverage into a substantially enclosed environment.

FIG. 1 is a block diagram of one embodiment of a system 100 for providing wireless coverage into a substantially enclosed environment. The system 100 includes at least one service provider interface 102, at least one master host unit (MHU) 104, at least one hybrid expansion unit (HEU) 106, at least one analog remote antenna cluster (ARAC) 108, and at least one digital remote antenna unit 110. Specifically, example system 100 includes hybrid expansion unit 106-1, analog remote antenna cluster 108-1, and digital remote antenna unit 110-1. Other example systems include greater or fewer service provider interfaces 102, master host units 104, hybrid expansion units 106, analog remote antenna clusters 108, and digital remote antenna units 110.

Service provider interface 102 may include an interface to one or more of a base transceiver station (BTS), a repeater, a bi-directional amplifier, a base station hotel or other appropriate interface for one or more service provider networks. In one embodiment, service provider interface 102 provides an interface to a plurality of services from one or more service providers. The services may operate using various wireless protocols and in various bands of frequency spectrum. For example, the services may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC Single Input Single Output (SISO) and Multiple Input Multiple Output (MIMO) services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), or other appropriate communication services.

In system 100, service provider interface 102 is connected to master host unit 104 over at least one analog communication link 112. Each analog communication link 112 includes two analog communication media, such as coaxial cables or fiber optic cables. One analog communication media is for downstream communication and the other is for upstream communication. The downstream and upstream analog communication media have been shown as a single analog communication link 112 for simplicity. In other embodiments, each analog communication link 112 only includes a single physical media, which is used to carry both the downlink and uplink streams between the service provider interface 102 and the master host unit 104.

The master host unit 104 receives downstream bands of radio frequency (RF) spectrum from the at least one service provider interface 102 over the at least one analog communication link 112. In addition, the master host unit 104 sends upstream bands of radio frequency (RF) spectrum to the at least one service provider interface 102 over the at least one analog communication link 112. In other embodiments, the service provider interface 102 and the master host unit 104 are connected over at least one digital communication link using at least one digital communication media. In some embodiments, separate analog communications links 112 are used for each service provider interface 102. Thus, while this disclosure describes at least one analog communication link 112, the format of this interface is not essential to operation of system 100. If an analog interface is used, the master host unit 104 converts the analog signal to a digital format as described below. If a digital interface is used, the master host unit 104 will either communicate the digital data as is or reformat the data into a representation that can be used for transport within the digital domain 116 described below. In example embodiments using a single physical medium for each analog communication link 112, frequency division multiplexing (FDM), time division multiplexing (TDM), and optical wavelength division multiplexing (WDM) are used to achieve a duplex connection over the single medium.

System 100 uses both digital and analog transport to extend the coverage of the wireless services into the substantially enclosed environment. First, system 100 uses digital transport over at least one digital communication link 114 to transport digitized RF spectrum between the master host unit 104 and the at least one hybrid expansion unit 106 and between the master host unit 104 and the at least one digital expansion unit 124. Each digital communication link 114 includes two digital communication media, such as fiber optic cables. One digital communication medium is for downstream communication and the other is for upstream communication. The downstream and upstream digital communication media have been shown as a single digital communication link 114 for simplicity. The areas of digital transport are called the digital domain 116. In other implementations, digital transport can be used to transport between other components as well and the digital domain 116 is more expansive. In other embodiments, each digital communication link 114 only includes a single physical media, which is used to carry both the downlink and uplink streams between the master host unit 104 and the at least one digital expansion unit 124. In example embodiments using a single physical media for each digital communication link 114, optical multiplexing techniques (i.e., wavelength division multiplexing (WDM), coarse wavelength division multiplexing (CWDM), or dense wavelength division multiplexing (DWDM)) are used to achieve a duplex connection over the single medium.

While an optical fiber is used in the example system 100, other appropriate communication media can also be used for the digital transport. For example, other embodiments use free space optics, high speed copper or other wired, wireless, or optical communication media for digital transport instead of the optical fibers used in each of the at least one digital communication link 114. By using digital transport over the at least one digital communication link 114, the bands of RF spectrum provided by the service provider interface 102 can be transported over long distances with minimal errors and more resiliency and robustness to signal loss and distortion of the physical medium. Thus, system 100 may extend coverage for wireless services to buildings located significant distances from the service provider interface 102.

Second, system 100 uses analog transport over at least one analog communication link 118 between the at least one hybrid expansion unit 106 and the at least one analog remote antenna cluster 108 to extend the reach of the digital transport into the substantially enclosed environment. Each analog communication link 118 includes two analog communication media, such as coaxial cable. One analog communication media is for downstream communication and the other is for upstream communication. The downstream and upstream analog communication media have been shown as a single analog communication link 118 for simplicity. While coaxial cable is used in the example system 100, other appropriate communication media can also be used for the analog transport. The areas of analog transport are called the analog domain 120. In other implementations, analog transport can be used to transport between other components as well and the analog domain 120 is more expansive. In other embodiments, each analog communication link 118 only includes a single physical medium, which is used to carry both the downlink and uplink streams between each hybrid expansion unit 106 and each analog remote antenna cluster 108. In example embodiments using a single physical medium for each analog communication link 118, frequency division multiplexing (FDM), time division multiplexing (TDM), and optical wavelength division multiplexing (WDM) are used to achieve a duplex connection over the single medium.

As discussed in further detail below, the various components of system 100 convert the various bands of RF spectrum between radio frequencies (RF), various intermediate frequencies (IF), digitized bands of RF spectrum, and digitized IF. As baseband representations of the signals can also be used, the invention can be generalized to convert between analog and digital signals. These various conversions require that the digital domain 116 and the analog domain 120 be synchronized in time and frequency. Time synchronization is important to the sampling and reconstruction of the signals. Time synchronization is also important when time alignment of signals in the various parallel branches of the system is necessary. Frequency synchronization is important to maintaining the absolute frequency of the signals at the external interfaces of the system. In order to synchronize the digital domain 116 and the analog domain 120, a common reference clock is distributed throughout both the digital domain 116 and the analog domain 120 as described in detail below. This common clock allows for accurate conversion and recovery between RF, IF, digitized bands of RF spectrum, and digitized IF, or more broadly between analog spectrum and digital spectrum.

Figure 2:
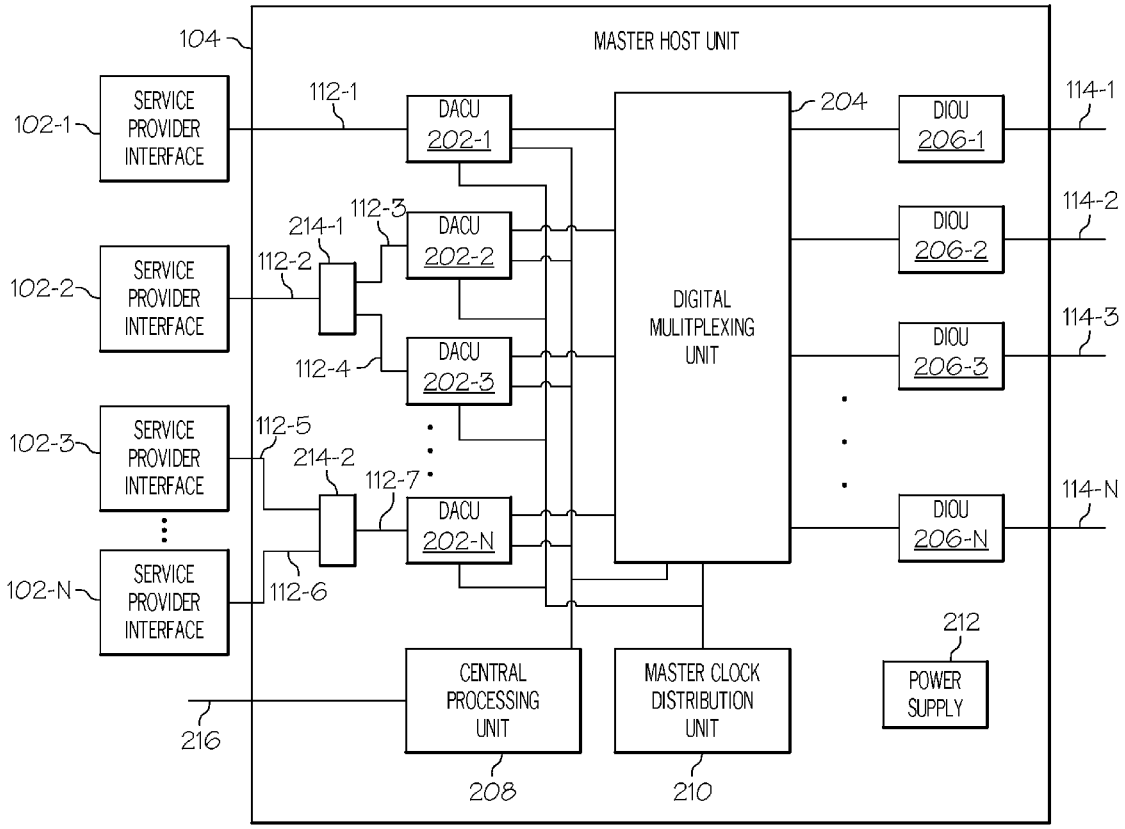
FIG. 2 is a block diagram of one embodiment of a master host unit for the system of FIG. 1.

FIG. 2 is a block diagram of one embodiment of the Master host unit 104 of system 100. Master host unit 104 includes at least one digital-analog conversion unit (DACU) 202, at least one digital multiplexing unit (DMU) 204, at least one digital input-output unit (DIOU) 206, at least one central processing unit (CPU) 208, at least one master clock distribution unit (MCDU) 210, and at least one power supply 212. In addition, the example master host unit 104 also includes at least one splitter/combiner 214.

The master host unit 104 communicates at least one band of analog spectrum with the at least one service provider interface 102. In the example system 100, there are a plurality of service provider interfaces 102-1, 102-2, 102-3, through 102-N. In addition, there are a plurality of DACUs 202-1, 202-2, 202-3, through 202-N. Each DACU 202 is coupled with at least one service provider interface 102. These couplings may be accomplished in various ways. For example, service provider interface 102-1 is directly coupled to DACU 202-1 through analog communication link 112-1. In contrast, service provider interface 102-2 is coupled to a first side of splitter/combiner 214-1 through analog communication link 112-2, DACU 202-2 is coupled to a second side of splitter/combiner 214-1 through analog communication link 112-3, and DACU 202-3 is coupled to the second side of splitter/combiner 214-1 through analog communication link 112-4. In addition, service provider interface 102-3 is coupled to a first side of splitter/combiner 214-2 through analog communication link 112-5, service provider interface 102-N is coupled to the first side of splitter/combiner 214-2 through analog communication link 112-6, and DACU 202-N is coupled to a second side of splitter/combiner 214-2 through analog communication link 112-7. As noted above, each analog communication link 112 of system 100 represents two analog media, one for downstream communication and one for upstream communication. In other embodiments, each link includes greater or fewer analog medium. In other embodiments, the master host unit communicates at least one band of digital spectrum with at least one service provider interface across at least one digital communication link using digital data or digitized spectrum. In these embodiments, the signals from the service provider interfaces 102-1, 102-2, 102-3, through 102-N are first converted from analog to digital before being transmitted across the at least one digital communication link to the master host unit 104.

Each DACU 202 operates to convert between at least one band of analog spectrum and N-bit words of digitized spectrum. In some embodiments, each DACU 202 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/0181482, and incorporated herein by reference. In some implementations, this occurs in stages, such that the analog spectrum is first converted to an IF frequency and subsequently converted to N-bit words of digitized spectrum. The bands of analog spectrum include signals in the frequency spectrum used to transport a wireless service, such as any of the wireless services described above. In some embodiments, master host unit 104 enables the aggregation and transmission of a plurality of services to a plurality of buildings or other structures so as to extend the wireless coverage of multiple services into the structures with a single platform.

The DMU 204 multiplexes N-bit words of digitized spectrum received from a plurality of DACU 202 (DACU 202-1 through DACU 202-N) and outputs at least one multiplexed signal to at least one DIOU 206 (DIOU 206-1 through DIOU 206-N). The DMU 204 also demultiplexes at least one multiplexed signal received from at least one DIOU 206 and outputs demultiplexed N-bit words of digitized spectrum to a plurality of DACU 202. In some embodiments, each DMU 204 is implemented with a Serialized RF (SeRF board) commercially available from ADC Telecommunications, Inc. of Eden Prairie, Minn. as part of the FlexWave™ Prism line of products. The SeRF board is also described in U.S. patent application Ser. No. 11/627,251, assigned to ADC Telecommunications, Inc., published in U.S. Patent Application Publication No. 2008/0181482, and incorporated herein by reference.

Each DIOU 206 communicates at least one digitized multiplexed signal across at least one digital communication link 114 (digital communication link 114-1 through digital communication link 114-N) using digital transport. The digitized multiplexed signal communicated across the digital communication link 114 includes N-bit words of digitized spectrum. Each DIOU 206 also receives at least one digitized multiplexed signal from the at least one digital communication link 114 using digital transport and sends the at least one digitized multiplexed signal to the DMU 204. In system 100 shown in FIG. 1, the digital communication link 114-1 is connected to hybrid expansion unit 106-1 and digital communication link 114-2 is connected to digital remote antenna unit 110-1. DIOU 206-1 communicates using digital transport with hybrid expansion unit 106-1 and DIOU 206-2 communicates using digital transport with digital remote antenna unit 110-1. As noted above, each digital communication link 114 represents two digital media, one for downstream communication and one for upstream communication. In addition to carrying the digitized multiplexed signals, each digital communication link 114 may also used to communicate other types of information such as system management information, control information, configuration information and telemetry information. The hybrid expansion unit 106 and digital remote antenna unit 110 are described in detail below.

Each DACU 202 and DMU 204 is synchronized with the other components of master host unit 104 and system 100 generally. Master clock distribution unit 210 generates a digital master reference clock signal. This signal is generated using any stable oscillator, such as a temperature compensated crystal oscillator (TCXO), an oven controlled crystal oscillator (OCXO), or a voltage controlled crystal oscillator (VCXO). In the embodiment shown in FIG. 2, the stable oscillator is included in the master clock distribution unit 210. In other embodiments, a reference clock external to the master host unit is used, such as a clock from a base station, a GPS unit, or a cesium atomic clock. In embodiments where digital data is communicated between service provider interface 102 and master host unit 104, the master clock distribution unit 210 may derive the reference clock signal from the digital data stream itself or an external clock signal may be used.

The digital master reference clock signal is supplied to each DACU 202 and each DMU 204 in the master host unit 104. Each DACU 202 uses the clock to convert between at least one band of analog spectrum and N-bit words of digitized spectrum. The DMU 204 uses the clock to multiplex the various streams of N-bit words of digitized spectrum together and outputs the multiplexed signal to each DIOU 206. Thus, the downstream digital data streams output by each DIOU 206 are synchronized to the digital master reference clock signal. Thus, through the clocking of the downstream digital data streams, the digital master reference clock signal is distributed to each hybrid expansion unit 106 and each digital expansion unit 124 through each corresponding digital communication link 114.

CPU 208 is used to control each DACU 202 and each DMU 204. An input/output (I/O) line 216 coupled to CPU 208 is used for network monitoring and maintenance. Typically, I/O line 216 is an Ethernet port used for external communication with the system. Other communication protocols such as Universal Serial Bus (USB), IEEE 1394 (FireWire), and serial may also be used. Power supply 212 is used to power various components within master host unit 104.

Figure 3:
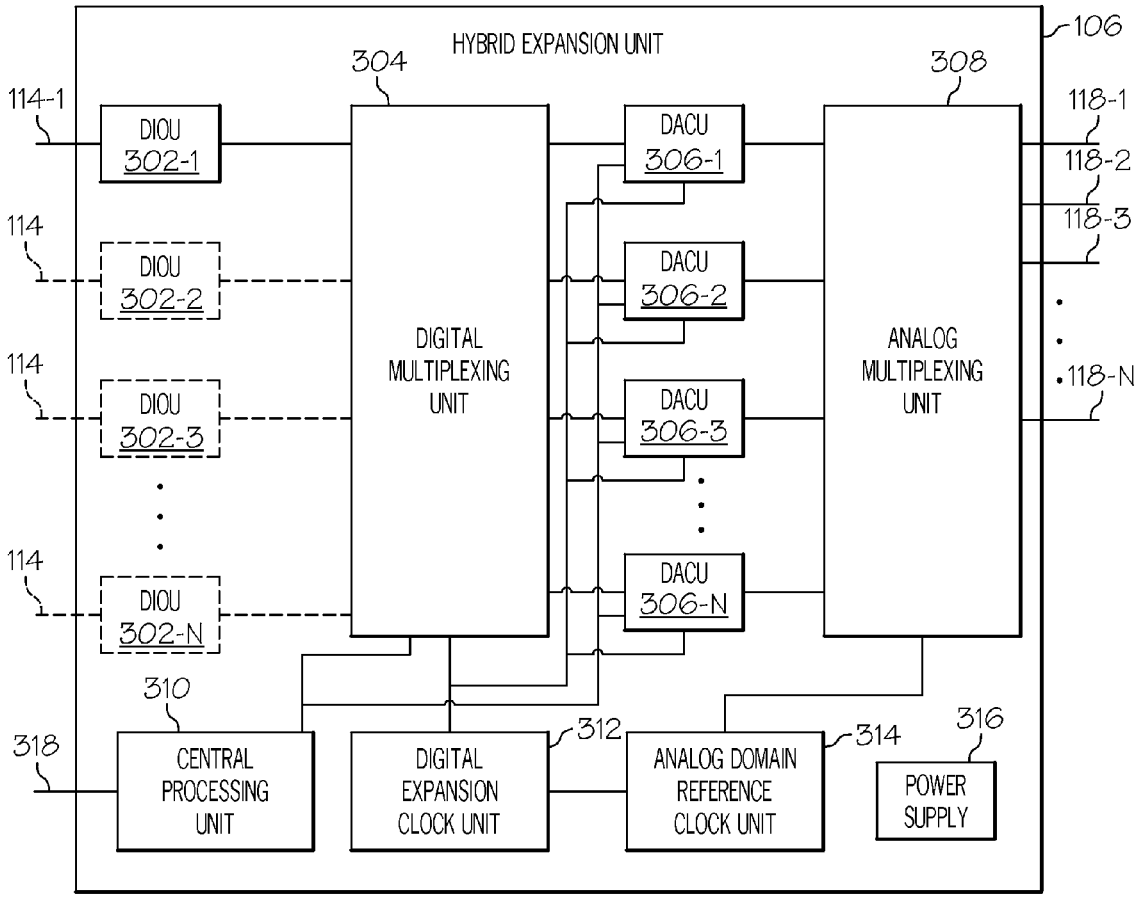
FIG. 3 is a block diagram of one embodiment of a hybrid expansion unit for the system of FIG. 1.

FIG. 3 is a block diagram of one embodiment of a hybrid expansion unit 106 of system 100. Hybrid expansion unit 106 of system 100 includes at least one digital input-output unit (DIOU) 302, at least one digital multiplexing unit (DMU) 304, at least one digital-analog conversion unit (DACU) 306, at least one analog multiplexing unit (AMU) 308, at least one central processing unit (CPU) 310, at least one digital expansion clock unit (DECU) 312, at least one analog domain reference clock unit (ADRCU) 314, and at least one power supply 316.

Each hybrid expansion unit 106 communicates at least one band of digitized spectrum with the master host unit 104 in the form of a multiplexed digitized signal containing N-bit words of digitized spectrum. The multiplexed digitized signal is received at the at least one DIOU 302 through at least one digital communication link 114. In the embodiment shown in FIG. 3, only one DIOU 302-1 is necessary if the hybrid expansion unit 106 is only coupled with a single upstream master host unit 104 (or single upstream digital expansion unit 124 as described in detail below). DIOU 302-2 through DIOU 302-N are optional. For example, in other embodiments, hybrid expansion unit 106 has multiple DIOUs 302 (DIOU 302-1 through DIOU 302-N) and is connected to multiple upstream master host units 104 or digital expansion units 124 through digital communication links 114. In other embodiments (such as system 900 shown in FIG. 9 and described in detail below), hybrid expansion unit 106 is connected to other hybrid expansion units through DIOU 302. In some embodiments including multiple upstream connections, the hybrid expansion unit 106 selects one DIOU 302 to extract the clock signal from.

The at least one DIOU 302 communicates the multiplexed digitized signal containing N-bit words of digitized spectrum to the DMU 304. The DMU 304 demultiplexes N-bit words of digitized spectrum received from the at least one DIOU 302 and sends N-bit words of digitized spectrum to the at least one DACU 306. The at least one DACU 306 converts the N-bit words of digitized spectrum to at least one band of analog spectrum. In some embodiments, the at least one DACU 306 converts the digitized signal back to the original analog frequency provided by the at least one service provider interface 102. In other embodiments, the at least one DACU 306 converts the digitized signal to an intermediate frequency (IF) for transport across the at least one analog communication link 118. In other embodiments, other components are included in the hybrid expansion unit 106 that frequency convert at least one band of analog spectrum output by the DACU 306 into an intermediate frequency for transport.

Each DACU 306 is coupled with the AMU 308. Each DACU 306 also converts at least one band of analog spectrum received from the AMU 308 into N-bit words of digitized spectrum. AMU 308 receives multiple bands of analog spectrum from multiple DACU 306 and multiplexes the bands of analog spectrum together into at least one multiplexed analog signal including multiple bands of analog spectrum. In some embodiments, there are a plurality of multiplexed analog signals output from the AMU 308. In some embodiments, all of the bands of analog spectrum from each DACU 306 are included on each multiplexed signal output by AMU 308. In other embodiments, a subset of the bands of analog spectrum from a plurality of DACU 306 are multiplexed onto one signal output on one of the at least one analog communication link 118, while a different subset of bands of analog spectrum from a plurality of DACU 306 are multiplexed onto another signal output on another of the at least one analog communication link 118. In other embodiments, different combinations of bands of analog spectrum from various DACU 306 are multiplexed onto various analog communication links 118.

In some embodiments, each DACU 306 converts a band of digitized spectrum to a different analog frequency from the other DACU 306. Each band of analog spectrum is pre-assigned to a particular analog frequency. Then, the AMU 308 multiplexes the various pre-assigned analog frequencies together, in addition to the analog domain reference clock and any communication, control, or command signals and outputs them using at least one analog communication link 118. In other embodiments, each DACU 306 converts a band of analog spectrum to the same analog frequency as the other DACU 306. Then, the AMU 308 shifts the received signals into distinct analog frequencies and multiplexes them together and outputs them using at least one analog communication link 118. In the embodiment shown in FIG. 3, the AMU 308 multiplexes the analog frequencies received from each DACU 306 onto each analog communication link 118.

In other embodiments, bands of frequency spectrum from certain DACU 306 are selectively distributed to certain analog communication links 118. In one example embodiment, analog communication link 118-1 is coupled to analog remote antenna cluster 108-1 and only a first subset of bands of analog spectrum are transported using analog communication link 118-1. Further, analog communication link 118-2 is coupled to analog remote antenna cluster 108-2 (shown in FIG. 8 and described below) and only a second subset of bands of analog spectrum are transported using analog communication link 118-2. In another embodiment, a first subset of bands of analog spectrum are transported to analog remote antenna cluster 108-1 using analog communication link 118-1 and a second subset of bands of analog spectrum are transported to the same analog remote antenna cluster 108-1 using analog communication link 118-2. It is understood that these examples are not limiting and that other system hierarchies and structures are used in other embodiments.

Each DMU 304, DACU 306, and AMU 308 is synchronized with the other components of hybrid expansion unit 106 and system 100 generally. In the example embodiment shown in FIG. 3, DIOU 302-1 receives the data stream from a master host unit 104 via a digital communication link 114 in an optical format. DIOU 302-1 converts the data stream from the optical format to an electrical format and passes the data stream onto the DMU 304. The DMU 304 extracts the digital master reference clock signal from the data stream itself. Because the data stream was synchronized with the digital master reference clock signal at the master host unit 104, it can be recovered from the data stream itself. The extracted digital master reference clock signal is sent to the digital expansion clock unit 312. Each DIOU 302 is not required to be synchronized to the other parts of the hybrid expansion unit unless it performs some type of function that requires it to be synchronized. In one embodiment, the DIOU 302 performs the extraction of the digital master reference clock in which case it would be synchronized to the remainder of the hybrid expansion unit.

The digital expansion clock unit 312 receives the digital master reference clock signal extracted from the data stream received from the master host unit 104. The digital expansion clock unit 312 communicates the digital master reference clock signal to various components of the hybrid expansion unit 106, including the DMU 304 and each DACU 306. Each DMU 304 and DACU 306 uses the digital master reference clock signal to synchronize itself with the system 100. In other embodiments, the digital expansion clock unit 312 could receive a copy of the data stream from the DMU 304 and extract the digital master reference clock signal from the data stream itself. In some embodiments, each DIOU 302 is selectable and configurable, so that one DIOU 302 can be selected to receive the digital master reference clock signal and other DIOUs 302 can be used to send the digital master reference clock signal upstream to other system components, such as secondary master host units, digital expansion units, or other hybrid expansion units.

In addition, the digital expansion clock unit 312 distributes the digital master reference clock signal to the analog domain reference clock unit 314. The analog domain reference clock unit 314 in turn generates an analog domain reference clock signal based on the digital master reference clock signal. This analog domain reference clock signal is used to synchronize analog components in the hybrid expansion unit 106, such as analog frequency conversion functions in the AMU 308. In addition, the AMU multiplexes the analog domain reference clock signal onto the multiplexed signals sent on each analog communication link 118 to the at least one analog remote antenna cluster 108.

In the embodiment of hybrid expansion unit 106 shown in FIG. 3, the analog domain reference clock unit 314 generates the analog domain reference clock signal by running the digital master reference clock signal through a phase locked loop circuit. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is multiplexed onto the multiplexed signals sent on each analog communication link 118 to at least one analog remote antenna cluster 108.

CPU 310 is used to control each DMU 304 and each DACU 306. An input/output (I/O) line 318 coupled to CPU 310 is used for network monitoring and maintenance. Typically, I/O line 318 is an Ethernet port used for external communication with the system. Power supply 316 is used to power various components within hybrid expansion unit 106.

In addition to performing the analog frequency conversion functions described above, the AMU 308 couples power onto the analog communication link 118. This power is then supplied through the analog communication link 118 to the downstream analog remote antenna cluster 108, including master analog remote antenna unit 402 and slave analog remote antenna units 404-1 as described below. The power coupled onto the analog communication link 118 is supplied from the power supply 316. In the example embodiment shown, 28 volts DC is received by AMU 308 from the power supply 316 and is coupled to the analog communication link 118 by AMU 308.

The hybrid expansion unit 106 shown in FIG. 3 sends and receives digital signals from the upstream and sends and receives analog signals in the downstream. In other example hybrid expansion units, both analog and digital signals can be sent in the downstream across various media. In one example embodiment a digital downstream output line (not shown) is connected to the downstream side of the DMU 304 and goes through a DIOU before being output in the downstream. This digital downstream line does not go through a DACU 306 or the AMU 308. In other example embodiments of the hybrid expansion unit 106, various other combinations of upstream and downstream digital and analog signals can be aggregated, processed, routed.

Figure 4:
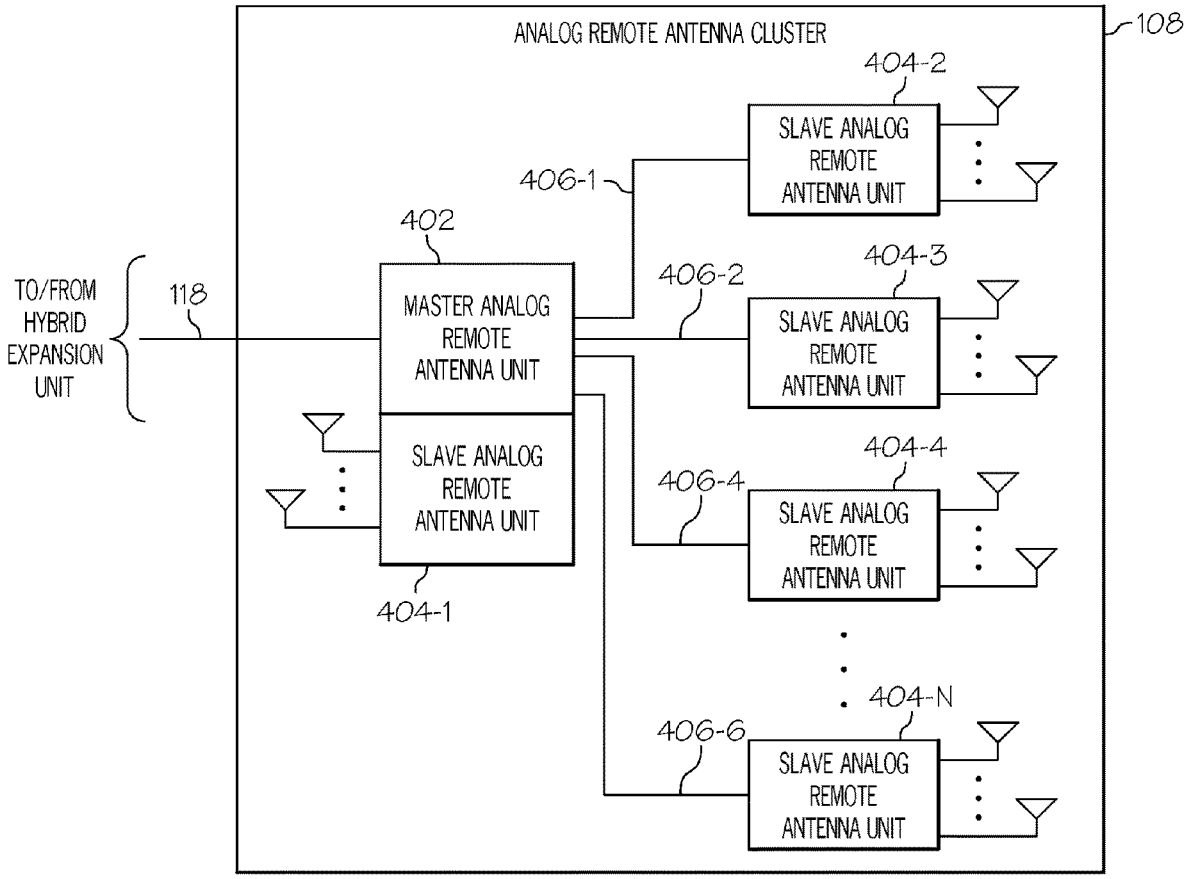
FIG. 4 is a block diagram of one embodiment of an analog remote antenna cluster for the system of FIG. 1.
Figure 5:
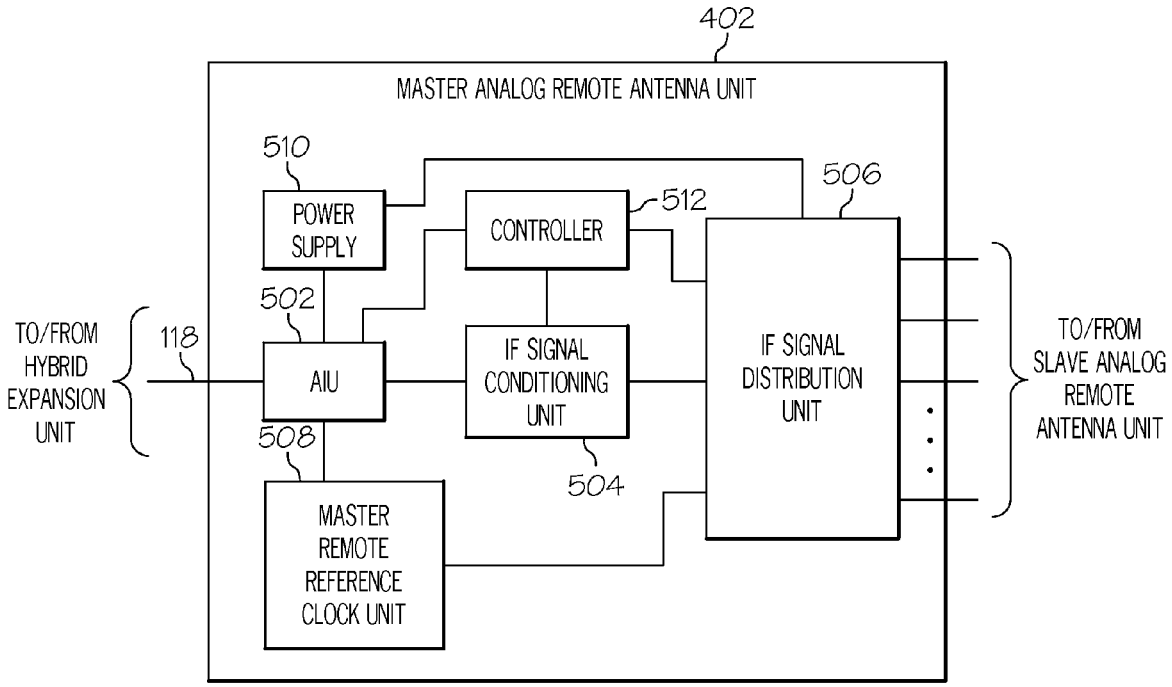
FIG. 5 is a block diagram of one embodiment of a master analog remote antenna unit for the analog remote antenna unit cluster of FIG. 4.
Figure 6:
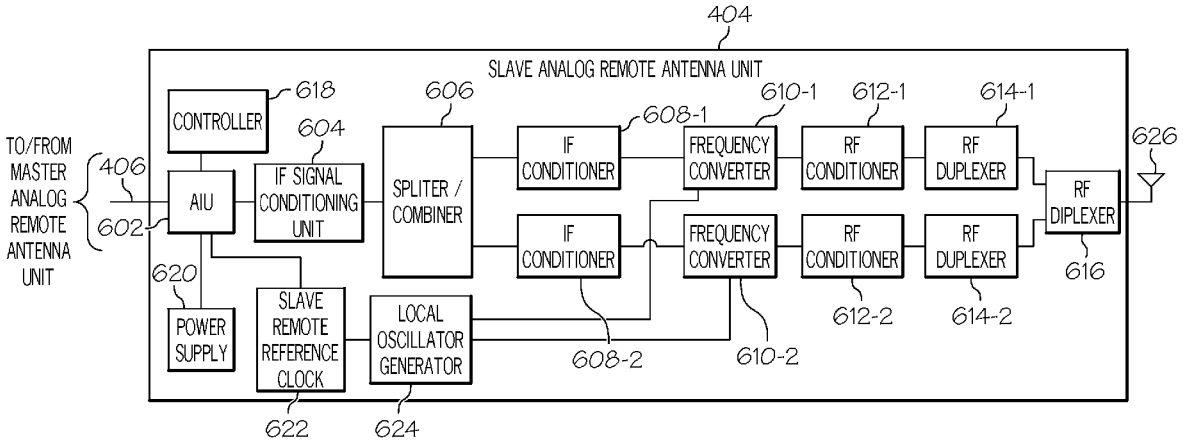
FIG. 6 is a block diagram of one embodiment of a slave analog remote antenna unit for the analog remote antenna unit cluster of FIG. 4.

In the embodiments described and depicted in FIGS. 4-6, the term analog intermediate frequency (IF) spectrum is used to describe the analog signals transported in the analog domain 120 between the hybrid expansion units 106 and the analog remote antenna clusters 108. The term analog IF spectrum is used to distinguish the signals from the analog RF spectrum format that is communicated to the service provider interface and the mobile devices over the air. Example system 100 uses analog IF spectrum for transport within the analog domain 120 that is lower in frequency than the analog RF spectrum. In other example embodiments, the RF spectrum can be transmitted at its native frequency within the analog domain 120 or using an analog IF spectrum that is higher in frequency than the analog RF spectrum.

FIG. 4 is a block diagram of one embodiment of an analog remote antenna cluster 108 for system 100. Analog remote antenna cluster 108 includes a master analog remote antenna unit 402 and a plurality of slave analog remote antenna units 404-1 through 404-N. In other embodiments, other configurations are used instead of this master/slave configuration.

In example analog remote antenna cluster 108, the master analog remote antenna unit 402 is coupled to at least one analog communication link 118. In the embodiment shown in FIG. 4, the at least one coaxial cable includes two coaxial cables. A first coaxial cable is used to transport downstream communication from a hybrid expansion unit 106 and the analog remote antenna cluster 108, including the bands of downstream analog spectrum associated with the service providers. A second coaxial cable is used to transport upstream communication from the analog remote antenna cluster 108 to the hybrid expansion unit 106, including the bands of upstream analog spectrum associated with the service providers. The downstream analog spectrum and the upstream analog spectrum are transported on separate coaxial cables in this example embodiment due to bandwidth limitations of the coaxial cable being used as media. In other example embodiments, a single analog communication link 118 is used to transport both the downstream and upstream analog spectrum. In other example embodiments, the at least one analog communication link 118 includes greater than two coaxial cables in order to transport even more bands. In other example embodiments, different media such as twisted pair (i.e., unshielded twisted pair (UTP) or screened unshielded twisted pair (ScTP)), CATV fibers, or optical fibers are used to transport the analog signals instead of coaxial cables.

In example analog remote antenna cluster 108, the master analog remote antenna unit 402 coordinates the distribution of various bands of analog RF spectrum to various slave analog remote antenna units 404 through analog communication links 406. The master analog remote antenna unit 402 is discussed in further detail below. In the example analog remote antenna cluster 108, each slave analog remote antenna unit 404-1 through 404-N receive at least one band of analog RF spectrum from the master analog remote antenna unit 402. Each slave analog remote antenna unit 404-1 through 404-N then transmits and receives the at least one band of analog RF spectrum wirelessly across an air medium using at least one antenna. The slave analog remote antenna unit 404 is discussed in further detail below.

FIG. 5 is a block diagram of one embodiment of a master analog remote antenna unit 402 from the analog remote antenna cluster 108. Master analog remote antenna unit 402 includes an analog interface unit (AIU) 502, an IF signal conditioning unit 504, an IF signal distribution unit 506, a master remote reference clock 508, a power supply 510, and a controller 512. Other example embodiments of master analog remote antenna unit include greater or fewer components.

The at least one analog communication link 118 is connected to the master analog remote antenna unit 402 through the AIU 502. One of the primary functions of the AIU is to handle any type of media conversion that may be necessary which in some embodiments may involve impedance transformation. Specifically, in the example embodiment shown in FIG. 5, the AIU 502 performs impedance conversion from the 75 ohms of the coaxial cables carrying the downstream and upstream bands of analog spectrum to the 50 ohms used within the master analog remote antenna unit 402. The AIU 502 also includes a coupler that is used to extract the DC power received from the hybrid expansion unit 106 across the at least one analog communication link 118.

In addition, the analog reference clock signal is extracted from the signal received from the hybrid expansion unit 106 across the at least one analog communication link 118. This analog reference clock signal is sent to the master remote reference clock unit 508. Any control signals received from the hybrid expansion unit 106 across the at least one analog communication link 118 are also extracted and sent to the controller 512.

Power supply 510 receives DC power from the AIU 502 and then generates the necessary DC power for operation of the various components onboard the master analog remote antenna unit 402. Thus, master analog remote antenna unit 402 does not need a separate power source other than the power that is received across the at least one analog communication link 118. In the example embodiment shown, 28 volts DC is extracted from the signal received across the at least one analog communication link 118 by the AIU 502. This 28 volts DC is then used by the power supply 510 to generate 5 volts DC and 12 volts DC to power the various devices in the master analog remote antenna unit. In addition, the power received across the analog communication link 118 is sent by the power supply 510 to the IF signal distribution unit 506 where it is coupled onto the analog communication links 406 that connect to each slave analog remote antenna unit 404 so that each slave analog remote antenna units 404 can also derive power from the cable instead of having a separate external power source. Thus, power for both the master analog remote antenna unit 402 and each slave analog remote antenna unit 404 is provided by the hybrid expansion unit 106 through the analog communication links 118 and 406.

As noted above, the AIU 502 extracts the clock signal and supplies it to the master remote reference clock unit 508. The master remote reference clock unit 508 refines the original clock signal received from the hybrid expansion unit 106 across the at least one analog communication link 118. In example embodiments, the master remote reference clock unit 508 processes the clock signal through a phase locked loop to refine the signal. In this way, noise, distortion, and other undesirable elements are removed from the reference clock signal. In other embodiments, the clock signal is processed through a filter to remove adjacent spurious signals. The refined signal output from the master remote reference clock unit 508 is sent to the IF signal distribution unit 506, where it is coupled onto the outputs of the IF signal distribution unit 506 that are connected to the slave analog remote antenna units 404. In this way, the master reference clock signal is redistributed by the master analog remote antenna unit 402 to all the slave analog remote antenna units 404.

IF signal conditioning unit 504 is configured to remove distortion in the analog IF signals that traverse the analog communication link 118. In the example master analog remote antenna unit 402 shown in FIG. 5, IF signal conditioning unit 504 performs cable equalization for signals sent and received across the at least one analog communication link 118. The at least one analog communication link 118 is generally quite long, causing the gain to vary as a function of frequency. IF signal conditioning unit 504 adjusts for gain at various frequencies to equalize the gain profile. IF signal conditioning unit 504 also performs filtering of the analog IF signals to remove adjacent interferers or spurious signals before the signals are propagated further through the system 100.

Controller 512 receives control signals from the AIU 502 that are received from hybrid expansion unit 106 across the at least one analog communication link 118. Controller 512 performs control management, monitoring, and can configure parameters for the various components of the master analog remote antenna unit 402. In the example master analog remote antenna unit 402, the controller 512 also drives the cable equalization algorithm.

IF signal distribution unit 506 is used to distribute the signals processed by the IF signal conditioning unit 504 to various slave analog remote antenna units 404 across analog communication links 406-1 through 406-N. In the example embodiment shown in FIG. 5, two bands are sent across each analog communication link 406 at two different analog IF frequencies. As noted above, the IF signal distribution unit 506 is also used to couple the DC power, the analog reference clock, and any other communication signals from the master analog remote antenna unit 402 onto analog communication link 406. The IF signal conditioning occurs at the IF signal conditioning unit 504 before the various analog signals are distributed at the IF signal distribution unit 506 in the embodiment shown in FIG. 5. In other embodiments, the IF signal conditioning could be done after the distribution of the analog signals.

FIG. 6 is a block diagram of one embodiment of a slave analog remote antenna unit 404 for the analog remote antenna unit cluster 108. The slave analog remote antenna unit 404 includes an analog interface unit (AIU) 602, an IF signal conditioning unit 604, a splitter/combiner 606, a plurality of IF conditioners 608, a plurality of frequency converters 610, a plurality of RF conditioners 612, a plurality of RF duplexers 614, and a RF diplexer 616. While the slave analog remote antenna unit 404 is described as a separate component, in some example embodiments, a slave analog remote antenna unit 404 is integrated with a master analog remote antenna unit 402.

The AIU 602 is connected to the analog communication link 406. The AIU 602 includes a coupler that is used to extract the DC power received from the master analog remote antenna unit 402 across the analog communication link 406. The AIU 602 passes the extracted DC power to the power supply 620. The power supply 620 in turn powers the various components of the slave analog remote antenna unit 404. The AIU 602 also extracts control signals received from the master analog remote antenna unit 402 across the analog communication link 406. The control signals are sent by the AIU 602 to the controller 618. The controller 618 uses the control signals to control various components of the slave analog remote antenna unit 404. In particular, the control signals are used by the controller 618 to control the gain in the IF signal conditioning unit 604. Adjustments may be made based on temperature changes and other dynamic factors. The control signals are also used for the configuration of the subsequent frequency converters 610, IF conditioners 608, and RF conditioners 612.

The AIU 602 also extracts the analog reference clock and sends it to the slave remote reference clock unit 622. In the embodiment shown in FIG. 6, the slave remote reference clock unit 622 refines the reference clock signal using a band pass filter. In other embodiments, the reference clock signal drives a phase locked loop to generate a refined reference clock signal. The slave remote reference clock unit 622 distributes the refined reference clock signal to the local oscillator generator 624, which generates local oscillator signals for the mixers used for frequency conversion. The local oscillator signals are generated using a phase locked loop. In the example shown in FIG. 6, the local oscillator generator 624 generates four local oscillator frequencies for each of the carrier signals of a first and second band. A first local oscillator frequency is used for downlink data in a first band and a second local oscillator frequency is used for the uplink data in the first band. A third local oscillator frequency is used for the downlink data in a second band and a fourth local oscillator frequency is used for the uplink data in the second band. In other example embodiments, greater or fewer bands are used and greater or fewer local oscillator signals are created by the local oscillator generator 624. For example, some embodiments may require diversity, so that two uplinks are needed for each downlink and three local oscillators would need to be generated for each band. In example embodiments, the AIU 602 is also used to impedance convert between the signal received on the analog communication link 406 and the signal processed by various components of the slave analog remote antenna unit 404.

Various analog spectrum received across the analog communication link 406 by the AIU 602 is passed to the IF signal conditioning unit 604. The IF signal conditioning unit 604 filters out noise, distortion, and other undesirable elements of the signal using amplification and filtering techniques. The IF signal conditioning unit 604 passes the analog spectrum to the splitter/combiner 606, where the various bands are split out of the signal in the downlink and combined together in the uplink. In the downstream, a first band is split out and passed to the IF conditioner 608-1 and a second band is split out and passed to the IF conditioner 608-2. In the upstream, a first band is received from the IF conditioner 608-1, a second band is received from the IF conditioner 608-2, and the two upstream bands are combined by the splitter/combiner 606.

In the downstream for band A, IF conditioner 608-1 passes the IF signal for band A to the frequency converter 610-1. The frequency converter 610-1 receives a downstream mixing frequency for band A from local oscillator generator 624. The frequency converter 610-1 uses the downstream mixing frequency for band A to convert the downstream IF signal for band A to a downstream RF signal for band A. The downstream RF signal for band A is passed onto the RF conditioner 612-1, which performs RF gain adjustment and filtering on the downstream RF signal for band A. The RF conditioner 612-1 passes the downstream RF signal for band A to the RF duplexer 614-1, where the downstream RF signal for band A is combined onto the same medium with an upstream RF signal for band A. Finally, the RF diplexer 616 combines band A and band B together. Thus, both band A and band B are transmitted and received across an air medium using a single antenna 626. In other embodiments, multiple antennas are used. In one specific embodiment, the RF diplexer 616 is not necessary because band A and band B are transmitted and received using independent antennas. In other embodiments, the downstream signals are transmitted from one antenna and the upstream signals are received from another antenna. In embodiments with these types of alternative antenna configurations, the requirements and design of the RF duplexers 614 and the RF diplexers 616 will vary to meet the requirements of the antenna configuration.

In the downstream for band B, IF conditioner 608-2 passes the IF signal for band B to the frequency converter 610-2. The frequency converter 610-2 receives a downstream mixing frequency for band B from local oscillator generator 624. The frequency converter 610-2 uses the downstream mixing frequency for band B to convert the downstream IF signal for band B to a downstream RF signal for band B. The downstream RF signal for band B is passed onto the RF conditioner 612-2, which performs more RF adjustment and filtering on the downstream RF signal for band B. The RF conditioner 612-2 passes the downstream RF signal for band B to the RF duplexer 614-2, where the downstream RF signal for band B is combined onto the same medium with an upstream RF signal for band B. Finally, the RF diplexer 616 combines band A and band B together as described above, such that both band A and band B are transmitted and received across an air medium using antenna 626.

In the upstream, antenna 626 receives the RF signal for both band A and band B and passes both onto RF diplexer 616 which separates band A from band B. Then, band A is passed to RF duplexer 614-1, where the upstream RF and downstream RF signals for band A are separated onto different signal lines. The upstream RF signal for band A is then passed to the RF conditioner 612-1, which performs gain adjustment and filtering on the upstream RF signal for band A. Finally, the upstream RF signal for band A is passed to frequency converter 610-1, which frequency converts the upstream RF signal for band A into an upstream IF signal for band A using an upstream mixing frequency generated by the local oscillator generator 624.

In addition, band B is passed from the RF diplexer 616 to the RF duplexer 614-2, where the upstream RF and downstream RF signals for band B are separated onto different signal lines. The upstream RF signal for band B is then passed to the RF conditioner 612-1, which performs gain adjustment and filtering on the upstream RF signal for band B. Finally, the upstream RF signal for band B is passed to frequency converter 610-2, which frequency converts the upstream RF signal for band B into an upstream IF signal for band B using an upstream mixing frequency generated by the local oscillator generator 624.

In embodiments where the functions of the master analog remote antenna unit 402 and the slave analog remote antenna unit 404-1 are integrated into the same physical package, as depicted in FIG. 4, some of the redundant functions in the master analog remote antenna unit 402 and the slave analog remote antenna unit 404-1 may be removed. For example, the two units may share the same controller and power supply. The slave remote reference clock 622 may not be required as the signal from the master remote reference clock unit 508 could be routed directly to the local oscillator generator 624.

Figure 7:
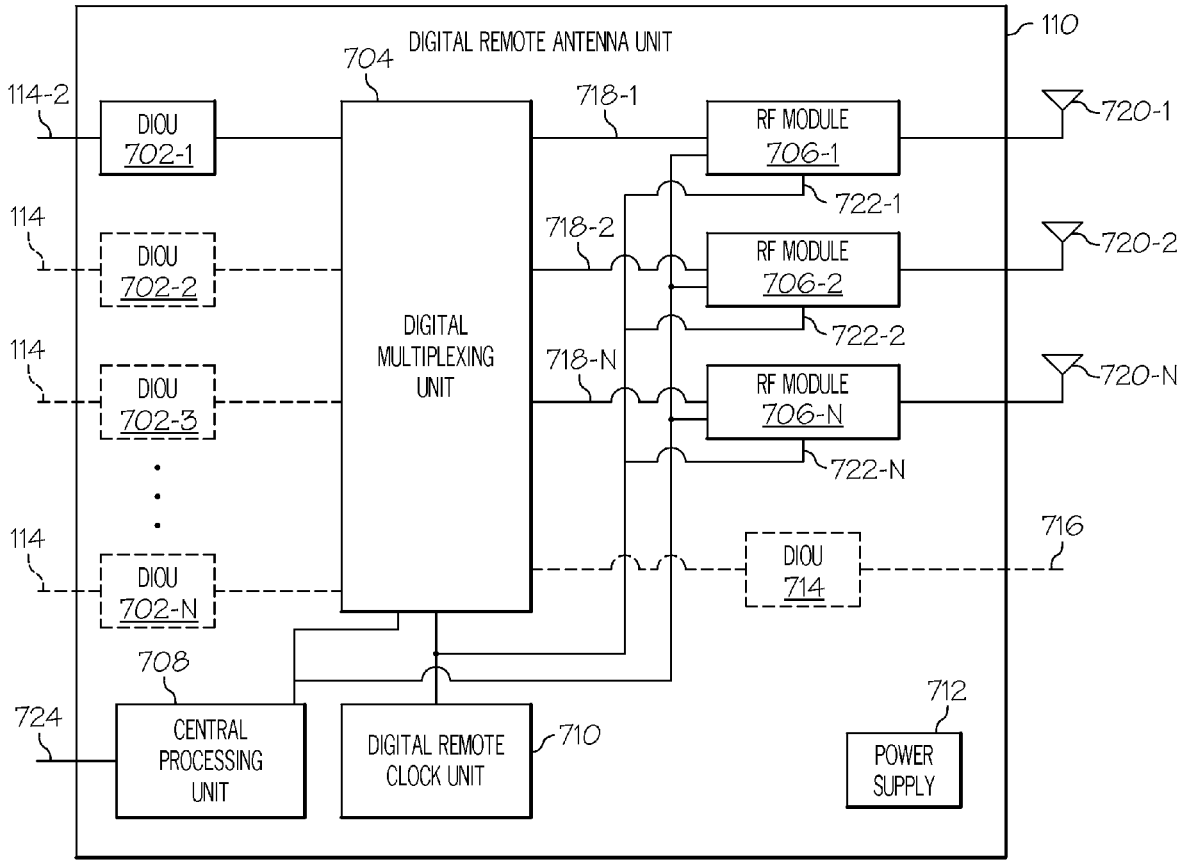
FIG. 7 is a block diagram of one embodiment of a digital remote antenna unit for the system of FIG. 1.

FIG. 7 is a block diagram of one embodiment of a digital remote antenna unit 110 of system 100. Digital remote antenna unit 110 includes at least one digital input-output unit (DIOU) 702, at least one digital multiplexing unit (DMU) 704, at least one RF module 706, at least one central processing unit (CPU) 708, at least one digital remote clock unit (DRCU) 710, and at least one power supply 712. In some embodiments, at least one digital input-output unit (DIOU) 714 is used to facilitate a digital output line 716. The digital output line 716 allows daisy-chaining multiple digital remote antenna units 110 together. The digital output line 716 of one digital remote antenna unit 110 can be coupled to the input of a DIOU 702 of another digital remote antenna unit 110. The digital output line 716 will be described in further detail below with regards to embodiments having daisy-chained digital remote antenna units 110.

Each digital remote antenna unit 110 communicates at least one band of digitized spectrum with the master host unit 104 in the form of a multiplexed digitized signal containing N-bit words of digitized spectrum. The multiplexed digitized signal is received at the at least one DIOU 702 through at least one digital communication link 114. In the embodiment shown in FIG. 7, only one DIOU 702-1 is necessary if the digital remote antenna unit 110 is only coupled with a single upstream master host unit 104 (or single upstream digital expansion unit 124 as described in detail below). DIOU 702-1 receives the data stream from a master host unit 104 via a digital communication link 114 in an optical format. DIOU 702-1 converts the data stream from the optical format to an electrical format and passes the data stream onto the DMU 704. DIOU 702-2 through DIOU 702-N are optional. For example, in other embodiments, digital remote antenna unit 110 has multiple DIOUs 702 (DIOU 702-1 through DIOU 702-N) and is connected to multiple upstream master host units 104 or digital expansion units 124 through digital communication links 114. In other embodiments, digital remote antenna unit 110 is connected to digital expansion units 124 through DIOU 702. In some embodiments including multiple upstream connections, the digital remote antenna unit 110 selects one DIOU 702 to extract the clock signal from.

As noted above, the at least one DIOU 702 communicates the multiplexed digitized signal containing N-bit words of digitized spectrum to the DMU 704. The DMU 704 demultiplexer N-bit words of digitized spectrum received from the at least one DIOU 702 and sends N-bit words of digitized spectrum across the at least one communication link 718 to the at least one RF module 706 (described in further detail with reference to FIG. 8 below). Each RF module 706 is also coupled to the digital remote clock unit 710 by a communication link 722.

The DMU 704 extracts the digital master reference clock signal from the data stream itself. Because the data stream was synchronized with the digital master reference clock signal at the master host unit 104, it can be recovered from the data stream itself The extracted digital master reference clock signal is sent to the digital remote clock unit 710. The digital remote clock unit 710 receives the digital master reference clock signal extracted from the data stream received from the master host unit 104. The digital expansion clock unit 312 communicates the digital master reference clock signal to various components of the digital remote antenna unit 110, including the DMU 704 and each RF module 706. Each DMU 704 uses the digital master reference clock signal to synchronize itself with the system 100. Each RF module receives the digital master reference clock signal from the digital remote clock unit 710 across a communication link 722 (i.e., communication link 722-1, communication link 722-2, and communication link 722-N). While each communication link 718 and communications link 722 are shown as separate lines in FIG. 7, in some embodiments a single multi-conductor cable is connected between the DMU 704 and each RF module 706. This multi-conductor cable includes both the communication link 718 and communications link 722 and carries the clock signals, data signals, control/management signals, etc.

In some embodiments, each DIOU 702 is selectable and configurable, so that one DIOU 702 can be selected to receive the digital master reference clock signal and other DIOUs 702 can be used to send the digital master reference clock signal upstream to other system components, such as secondary master host units, digital expansion units, hybrid expansion units, or other digital remote antenna units. Each DIOU 702 is not required to be synchronized to the other parts of the digital remote antenna unit 110 unless it performs some type of function that requires it to be synchronized. In one embodiment, the DIOU 702 performs the extraction of the digital master reference clock in which case it would be synchronized to the remainder of the hybrid expansion unit.

In the downstream, each RF module 706 receives N-bit words of digitized spectrum and outputs an RF signal that is transmitted across an air medium using at least one respective antenna 720. In the upstream, each RF module 706 receives RF signals received across an air medium using the at least one respective antenna 720 and outputs N-bit words of digitized spectrum to the DMU 704. In the digital remote antenna unit 110 shown in FIG. 7, each RF module 706 converts between N-bit words of digitized spectrum and RF signals for a single band. In other embodiments, at least one RF module 706 converts between N-bit words of digitized spectrum and RF signals for multiple bands. A different antenna element is used for each signal path in some example embodiments having multiple bands, such as embodiments having diversity channels or multiple signal branches used for smart antennas where signals overlap spectrally. In the digital remote antenna unit 110 shown in FIG. 7, each RF module 706 is connected to a separate respective antenna 720. In other embodiments, splitters and combiners are used to couple the outputs of a plurality of RF modules 706 together to a single antenna.

As noted above, some embodiments of digital remote antenna unit 110 include at least one DIOU 714 and at least one digital output line 716 that allow daisy-chaining multiple digital remote antenna units 110 together. In example embodiments, DIOU 714 is coupled to digital multiplexing unit 704. In the downstream, DIOU 714 converts the data stream coming from the DMU 704 from an electrical format to an optical format and outputs the data stream across digital output line 716. In the upstream, DIOU 714 converts the data stream coming across digital output line 716 from an optical format to an electrical format and passes the data stream onto the DMU 704. Thus, as described below, a plurality of digital remote antenna units 110 can be daisy-chained together using the digital output line 716 on at least one digital remote antenna unit 110.

CPU 708 is used to control each DMU 704 and each RF module 706. While the links between the CPU 708 and the DMU 704 and each RF module 706 are shown as separate links from the communication links 718 and the communications links 720, it can be part of a multi-conductor cable as described above. An input/output (I/O) line 724 coupled to CPU 708 is used for network monitoring and maintenance. Typically, I/O line 724 is an Ethernet port used for external communication with the system. Power supply 712 is used to power various components within digital remote antenna unit 110.

Figure 8:
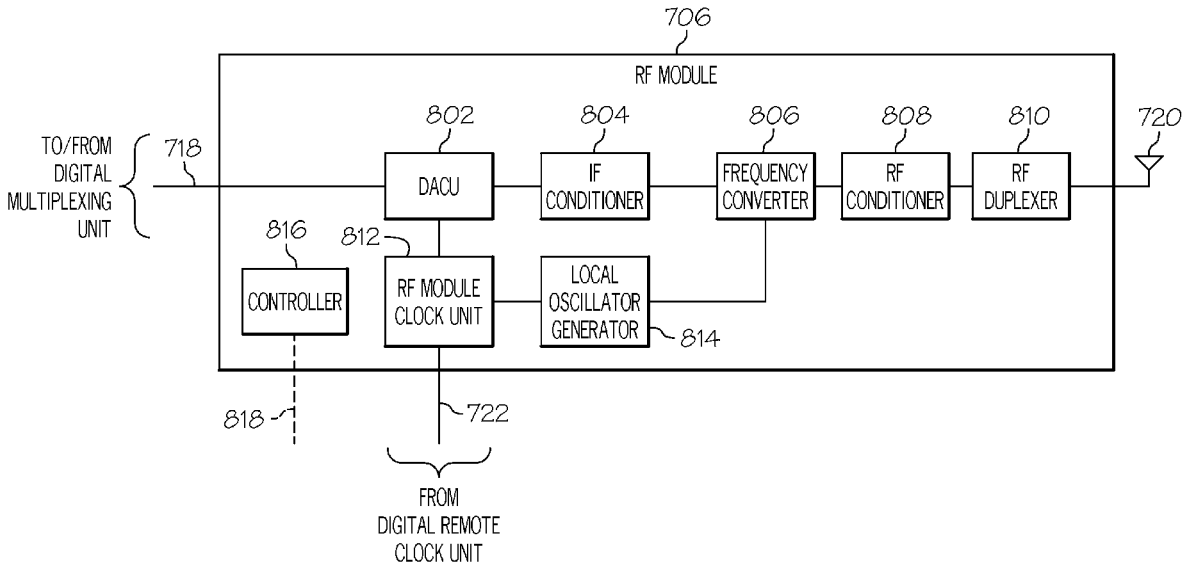
FIG. 8 is a block diagram of one embodiment of a RF module for the digital remote antenna unit of FIG. 7.

FIG. 8 is a block diagram of one embodiment of a RF module 706 for digital remote antenna unit 110. The RF module 706 includes a digital-analog conversion unit (DACU) 802, an IF conditioner 804, a frequency converter 806, a RF conditioner 808, a RF duplexer 810, a RF module clock unit, a local oscillator generator 814, and a controller 816. While the RF module 706 is described as a separate component, in some example embodiments, some or all of the components included in RF module 706 are integrated directly in digital remote antenna unit 110. In other embodiments, other components are used to perform the same or similar functions to the components of RF module 706 described below.

The DACU 802 is connected to a communication link 718, where it communicates N-bit words of digitized spectrum with the DMU 704. The DACU 802 is also connected to the RF module clock unit 812, where it receives a digital master reference clock signal from the digital remote clock unit 710 of the digital remote antenna unit 110 across a communication link 722. In other embodiments, DACU 802 can also communicate to or from other components of the digital remote antenna unit 110. The DACU 802 converts between the N-bit words of digitized spectrum and an analog intermediate frequency (IF) spectrum using the digital master reference clock signal. In the downstream, the analog intermediate frequency (IF) is passed through the IF conditioner 804 that filters, amplifies, and attenuates the IF spectrum prior to frequency up-conversion. In the upstream, the analog intermediate frequency (IF) is passed through the IF conditioner 804 that filters, amplifies, and attenuates the IF spectrum prior to analog to digital conversion by the DACU 802.

The RF module clock unit 812 receives the digital master reference clock signal across the communication link 722 and distributes the signal to the DACU 802. The RF module clock unit 812 also generates an analog domain reference clock signal based on the digital master reference clock signal. This analog domain reference clock signal is used to synchronize analog components in the RF module 706. In the embodiment of RF module 706 shown in FIG. 8, the RF module clock unit 812 generates the analog domain reference clock signal by running the digital master reference clock signal through a phase locked loop circuit. The generated analog domain reference clock signal is then passed onto the local oscillator generator 814. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is sent to the local oscillator generator 814.

The frequency converter 806 converts between IF spectrum and RF spectrum. The frequency converter 806 is connected to the local oscillator generator 814. The local oscillator generator 814 receives the analog domain reference clock from the RF module clock unit 812. In example embodiments, the analog domain reference clock signal is first refined using a band pass filter or other appropriate filter. In other embodiments, the analog domain reference clock signal drives a phase locked loop to generate a refined reference clock signal. In the example shown in FIG. 8, the local oscillator generator 824 generates two local oscillator frequencies for each of the carrier signals of the band serviced by the RF module 706. A first local oscillator frequency is used for downlink data and a second local oscillator frequency is used for the uplink data. While the RF module 706 is described as only servicing a single band, other embodiments include greater numbers of bands where greater numbers of oscillator signals are created by the local oscillator generator 814. For example, some embodiments may require diversity, so that two uplinks are needed for each downlink and three local oscillators would need to be generated for each band.

The frequency converter 806 uses the downstream mixing frequency to convert the downstream IF signal to a downstream RF signal. The downstream RF signal is passed onto the RF conditioner 808, which performs RF gain adjustment and filtering on the downstream RF signal. The RF conditioner 808 passes the downstream RF signal to the RF duplexer 810, where the downstream RF signal is combined onto the same medium with the upstream RF signal. In example RF module 706, the RF signals are transmitted and received across an air medium using a single antenna 720.

In the upstream, antenna 720 receives the RF signal and passes it onto the RF duplexer 810, where the upstream RF and downstream RF signals are separated onto different signal lines. The upstream RF signal is then passed to the RF conditioner 808, which performs gain adjustment and filtering on the upstream RF signal. Finally, the upstream RF signal is passed to frequency converter 806, which frequency converts the upstream RF signal into an upstream IF signal using the upstream mixing frequency generated by the local oscillator generator 814.

Each RF module 706 of example digital remote antenna unit 110 uses a separate antenna 720. In other embodiments, RF diplexers are implemented downstream of multiple RF modules 706, thereby allowing multiple RF bands to use a single antenna. In other embodiments, multiple antennas are used for each RF module 706. For example, in other embodiments, the downstream signals are transmitted from one antenna and the upstream signals are received from another antenna. In embodiments with these type of alternative antenna configurations, the requirements and design of the RF duplexers and any necessary RF diplexers will vary to meet the requirements of the antenna configuration.

While the frequency conversion described above is a two step process between digital and an IF analog signal and then between the IF analog signal and an RF analog signal, in other embodiments, a direct conversion occurs between the digital signals received on communication link 718 and the RF signals output across antenna 720. In such embodiments, the functionality of the DACU 802, the IF conditioner 804, and frequency converter 806 may be combined or replaced with other appropriate components.

The controller 816 uses control and management signals received over a communication link 816 to control and manage various components of the RF module 706. In particular, the control and management signals are used by the controller 816 to control and manage the gain in the IF conditioner 804. Adjustments may be made based on temperature changes and other dynamic factors. While communication link 816 is shown as a separate communication link, in some embodiments the communication link 816 is combined with the communication link 718 using a multi-conductor cable as described above with reference to FIG. 7. In such embodiments, the multi-conductor cable couples the digital multiplexing unit 704 with each RF module 706 and the control and management messages are communicated over a pair of conductors in this cable. In other example embodiments, the multi-conductor cable is a generic communication link that combines the communication link 718, the communication link 816, and the communication link 722 into a single cable that interfaces each RF module 706 with the digital multiplexing unit 704. The control signals are also used for the configuration of the subsequent frequency converter 806 and RF conditioner 808. In example RF module 706, all of the components of RF module 706 are powered by the power supply 712 of the digital remote antenna unit 110. In other embodiments, a separate power supply is included in each RF module 706 and is used to power the various components of RF module 706. In other embodiments, signal line power extraction is used to supply power to the RF module 706.

FIGS. 9-11 and 13-14 are block diagrams of other embodiments of systems for providing wireless coverage into a substantially enclosed environment. The embodiments of FIGS. 9-11 and 13-14 show various topologies as described below. Because the operation of the components of the various topologies is similar to that described above, only the differences based on topologies is described below.

Figure 9:
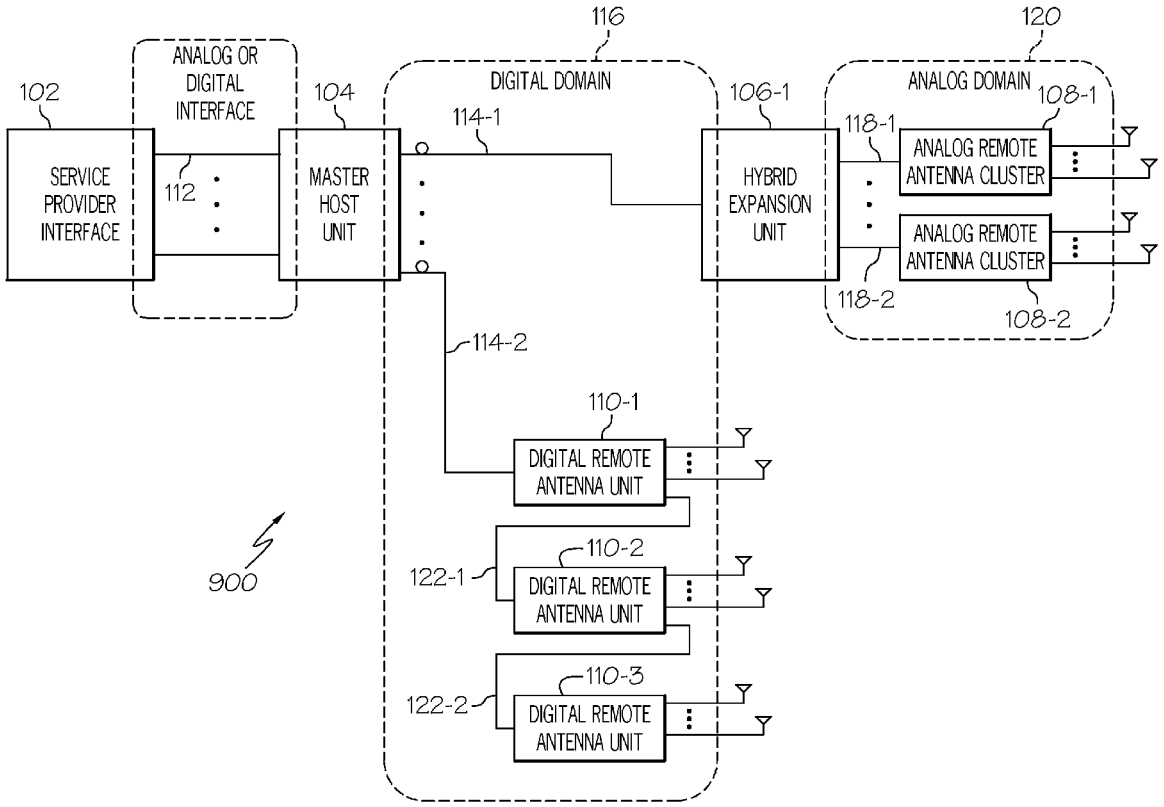
FIG. 9 is a block diagram of another embodiment of a system for providing wireless coverage into a substantially enclosed environment.

FIG. 9 is a block diagram of another embodiment of a system 900 for providing wireless coverage into a substantially enclosed environment. The system 900 includes the same components as system 100, including at least one service provider interface 102, at least one master host unit 104, at least one hybrid expansion unit 106, at least one analog remote antenna cluster 108, and at least one digital remote antenna unit 110. The differences between system 100 and system 900 are only in topology.

Example system 900 differs from example system 100 because it includes hybrid expansion unit 106-1, analog remote antenna cluster 108-1, analog remote antenna cluster 108-2, digital remote antenna unit 110-1, digital remote antenna unit 110-2, and digital remote antenna unit 110-3. Analog remote antenna cluster 108-2 operates in the same manner as analog remote antenna cluster 108-1. Digital remote antenna unit 110-2 and digital remote antenna unit 110-3 operate in the same manner as digital remote antenna unit 110-1. At least one DIOU 702 of digital remote antenna unit 110-2 is daisy chain connected to digital output line 716 of digital remote antenna unit 110-1 through a first digital remote antenna unit connection link 122-1. Likewise, at least one DIOU 702 of digital remote antenna unit 110-3 is daisy chain connected to digital output line 716 of digital remote antenna unit 110-2 through a second digital remote antenna unit connection link 122-2.

Figure 10:
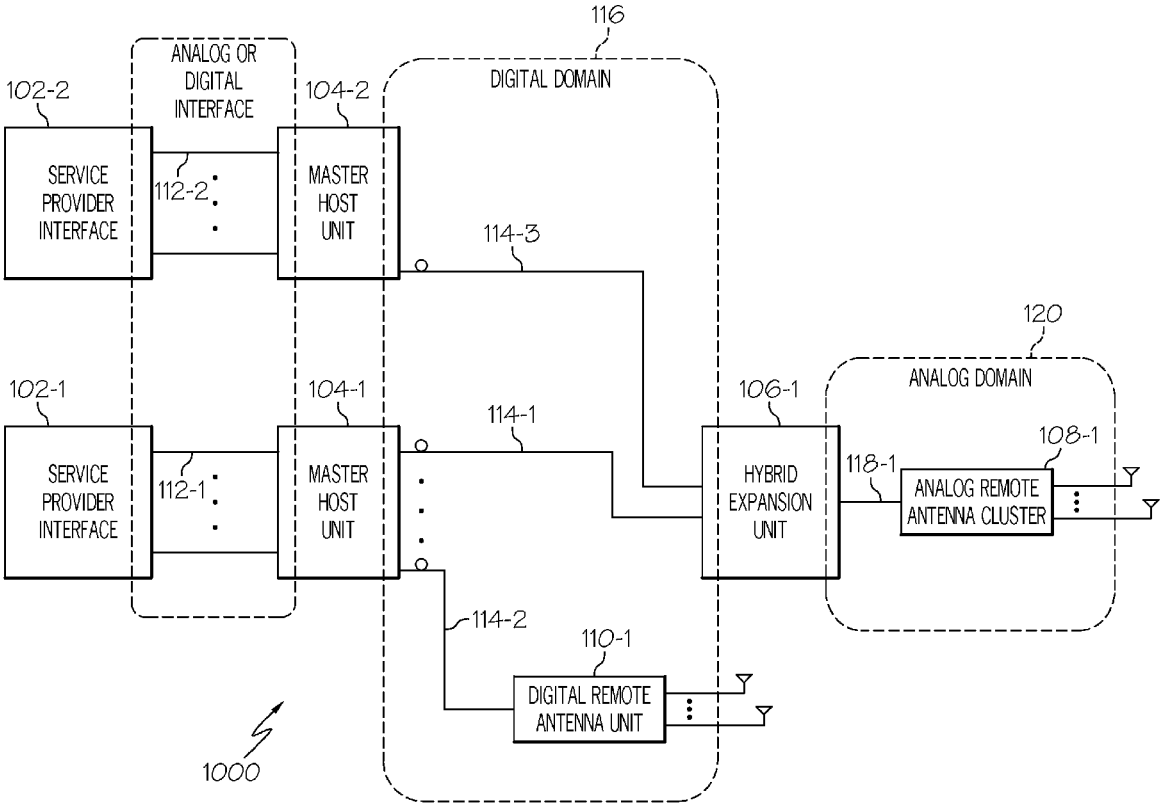
FIG. 10 is a block diagram of another embodiment of a system for providing wireless coverage into a substantially enclosed environment.

FIG. 10 is a block diagram of another embodiment of a system 1000 for providing wireless coverage into a substantially enclosed environment. The system 1000 includes the same components as system 100, including a first service provider interface 102-1, a second service provider interface 102-2, a master host unit 104-1, a master host unit 104-2, a hybrid expansion unit 106-1, an analog remote antenna cluster 108-1, a digital remote antenna unit 110-1, and an analog communication link 112-1. The differences between system 100 and system 1000 are that system 1000 includes additional service provider interface 102-2, master host unit 104-2, and analog communication link 112-2. Hybrid expansion unit 106-1 is connected to both the master host unit 104-1 and the master host unit 104-2, through digital communication link 114-1 and digital communication link 114-3 respectively. In addition, hybrid expansion unit 106-1 includes DIOU 302-1 and DIOU 302-2 as shown in FIG. 3. DIOU 302-1 is coupled with digital communication link 114-1 and DIOU 302-2 is coupled with digital communication link 114-3. DIOU 302-1 and DIOU 302-2 are coupled to DMU 304, which multiplexes and demultiplexes upstream and downstream signals together allowing various bands to be distributed from master host unit 104-1 and master host unit 104-2 through analog remote antenna cluster 108-1. Other example systems include greater or fewer service provider interfaces 102, master host units 104, hybrid expansion units 106, analog remote antenna clusters 108, and digital remote antenna units 110.

Figure 11:
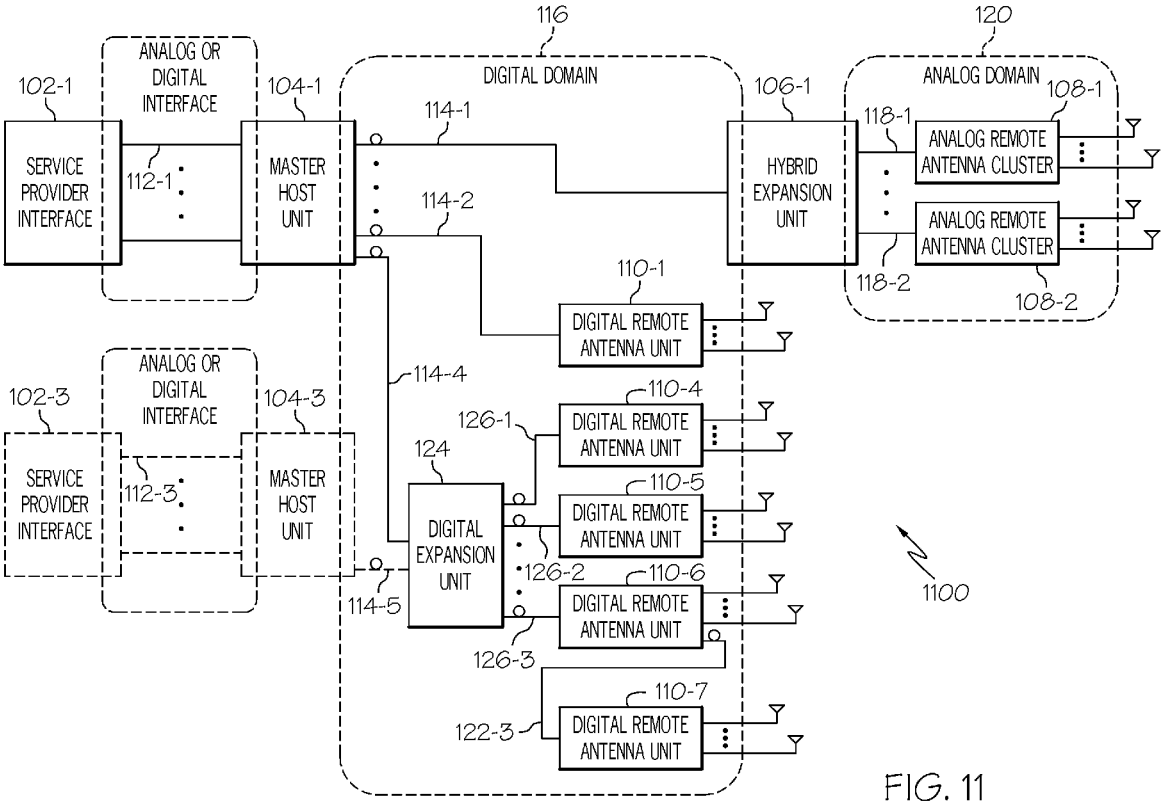
FIG. 11 is a block diagram of another embodiment of a system for providing wireless coverage into a substantially enclosed environment.

FIG. 11 is a block diagram of another embodiment of a system 1100 for providing wireless coverage into a substantially enclosed environment. The system 1100 includes the same components as system 100, including a first service provider interface 102-1, a master host unit 104-1, a hybrid expansion unit 106-1, an analog remote antenna cluster 108-1, a digital remote antenna unit 110-1, and an analog communication link 112-1. The differences between system 100 and system 1100 are that system 1100 includes analog remote antenna cluster 108-2, a digital expansion unit 124, digital remote antenna unit 110-4, digital remote antenna unit 110-5, digital remote antenna unit 110-6, and digital remote antenna unit 110-7. Analog remote antenna cluster 108-1 is connected to hybrid expansion unit 106-1 through analog communication link 118-1 and analog remote antenna cluster 108-2 is connected to hybrid expansion unit 106-1 through analog communication link 118-2. Digital expansion unit 124 is connected to master host unit 104-1 through digital communication link 114-4. Digital remote antenna unit 110-4 is connected to digital expansion unit 124 through digital expansion communication link 126-1. Digital remote antenna unit 110-5 is connected to digital expansion unit 124 through digital expansion communication link 126-2. Digital remote antenna unit 110-6 is connected to digital expansion unit 124 through digital expansion communication link 126-3. At least one DIOU 702 of digital remote antenna unit 110-7 is daisy chain connected to digital output line 716 of digital remote antenna unit 110-6 through a digital remote antenna unit connection link 122-3.

Figure 12:
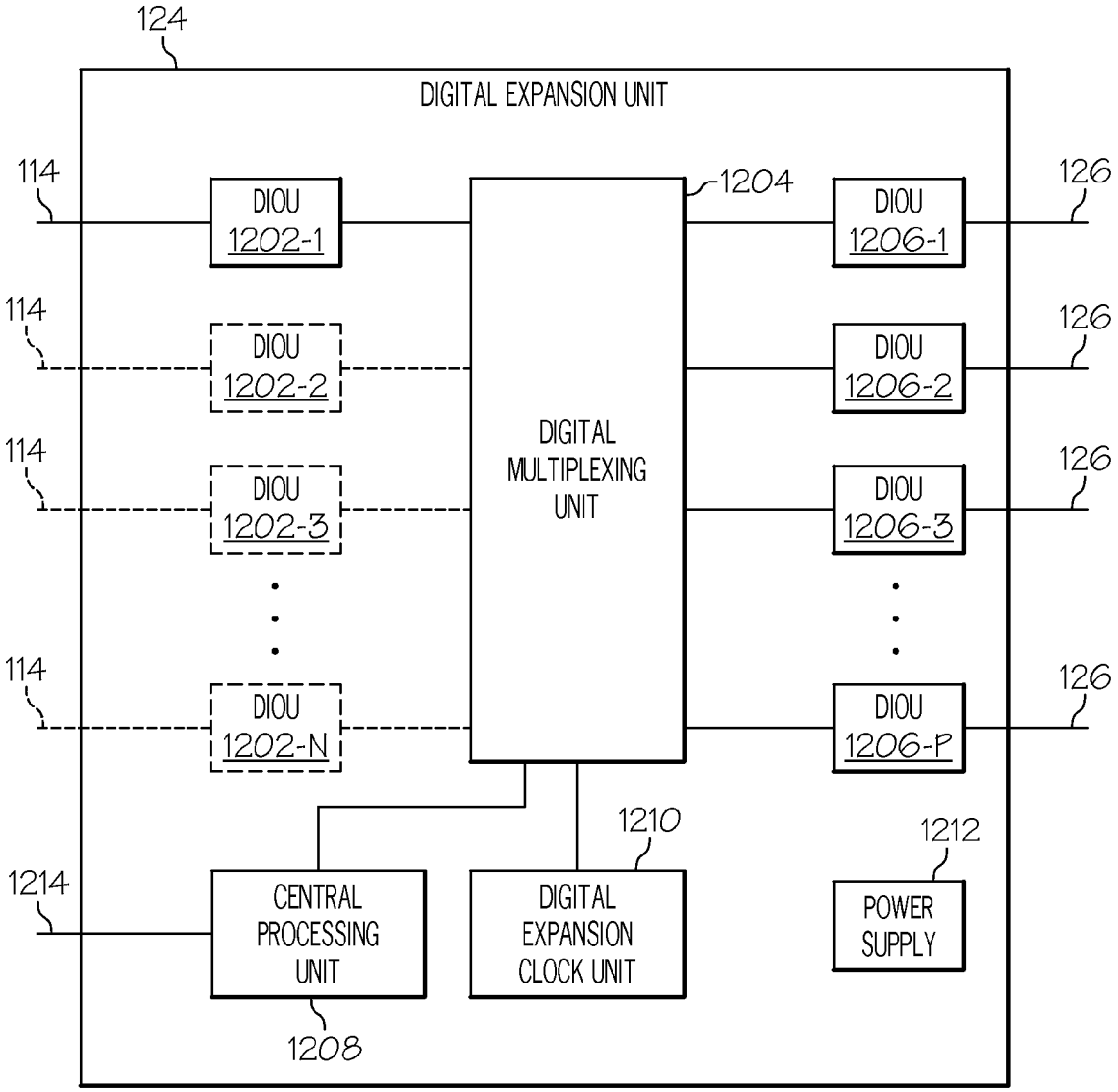
FIG. 12 is a block diagram of one embodiment of a digital expansion unit for the system of FIG. 8.

FIG. 12 is a block diagram of one embodiment of a digital expansion unit 124 of system 1200. Digital expansion unit 124 includes at least one digital input-output unit (DIOU) 1202, at least one digital multiplexing unit (DMU) 1204, at least one digital input-output unit (DIOU) 1206, at least one central processing unit (CPU) 1208, at least one digital expansion clock unit 1210, and at least one power supply 1212. It is understood that the DMU 1204 performs both multiplexing and demultiplexing functionality between the various upstream and downstream connections.

The digital expansion unit 124 communicates N-bit words of digitized spectrum between the master host unit 104 and at least one hybrid expansion unit 106. Each DIOU 1202 (DIOU 1202-1 through DIOU 1202-N) of the digital expansion unit 124 operates to convert between optical signals received across a digital expansion communication link 126 and electrical signals processed within the digital expansion unit 124. In the downstream, the converted signals are passed from each DIOU 1202 to the DMU 1204, where they are multiplexed together and output to at least one DIOU 1206 which converts the electrical signals to optical signals and outputs the optical signals to at least one hybrid expansion unit or another digital expansion unit for further distribution. In the upstream, each DIOU 1206 converts optical signals received from a downstream hybrid expansion unit or digital expansion unit into electrical signals, which are passed onto the DMU 1204. The DMU 1204 takes the upstream signals and multiplexes them together and outputs them to at least one DIOU 1202, which converts the electrical signals into optical signals and sends the optical signals across a digital expansion communication link 126 toward the master host unit. In other embodiments, multiple digital expansion units are daisy chained for expansion in the digital domain.

In the example embodiment shown in FIG. 12, the CPU 1208 is used to control each DMU 1204. An input/output (I/O) line 1214 coupled to CPU 1208 is used for network monitoring and maintenance. Typically, I/O line 1214 is an Ethernet port used for external communication with the system. The DMU 1204 extracts the digital master reference clock signal from any one digital data stream received at any one of the DIOU 1202 and DIOU 1206 and sends the digital master reference clock signal to the digital expansion clock unit 1210. The digital expansion clock unit 1210 then provides the digital master reference clock signal to other functions in the DMU that require a clock signal. Power supply 1212 is used to power various components within digital expansion unit 124.

In some embodiments, system 1100 further includes additional service provider interface 102-3 and master host unit 104-3. Master host unit 104-3 is connected to service provider interface 102-3 with analog communication link 112-3. Digital expansion unit 124 is connected to master host unit 104-3 through digital communication link 114-5. In addition, digital expansion unit 124 includes DIOU 1202-1 and DIOU 1202-2 as shown in FIG. 12. DIOU 1202-1 is coupled with digital communication link 114-4 and DIOU 1202-2 is coupled with digital communication link 114-5. DIOU 1202-1 and DIOU 1202-2 are coupled to DMU 1204, which multiplexes and demultiplexes upstream and downstream signals together allowing various bands to be distributed from master host unit 104-1 and master host unit 104-3 through the analog remote antenna clusters 108 and the digital remote antenna units 110. Other example systems include greater or fewer service provider interfaces 102, master host units 104, hybrid expansion units 106, analog remote antenna clusters 108, digital remote antenna units 110, and digital expansion units 124.

Figure 13:
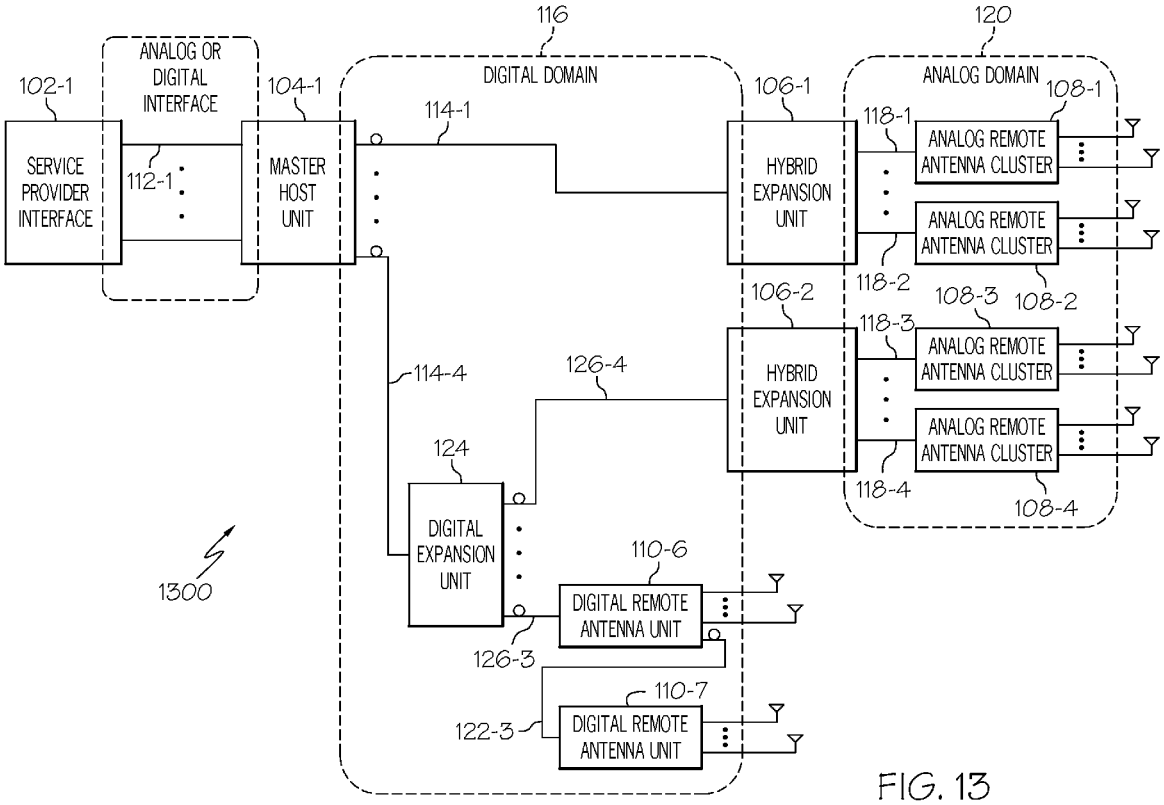
FIG. 13 is a block diagram of another embodiment of a system for providing wireless coverage into a substantially enclosed environment.

FIG. 13 is a block diagram of another embodiment of a system 1300 for providing wireless coverage into a substantially enclosed environment. The system 1300 includes some of the same components as system 1100, including a first service provider interface 102-1, a master host unit 104-1, a hybrid expansion unit 106-1, an analog remote antenna cluster 108-1, an analog remote antenna cluster 108-2, a digital expansion unit 124, a digital remote antenna unit 110-6, and a digital remote antenna unit 110-7. In addition, system 1100 also includes hybrid expansion unit 106-2 and analog remote antenna cluster 108-3 and 108-4. Hybrid expansion unit 106-2 is coupled to digital expansion unit 124 through digital expansion communication link 126-4. Analog remote antenna cluster 108-3 is connected to hybrid expansion unit 106-2 through analog communication link 118-3 and analog remote antenna cluster 108-4 is connected to hybrid expansion unit 106-2 through analog communication link 118-4.

Figure 14:
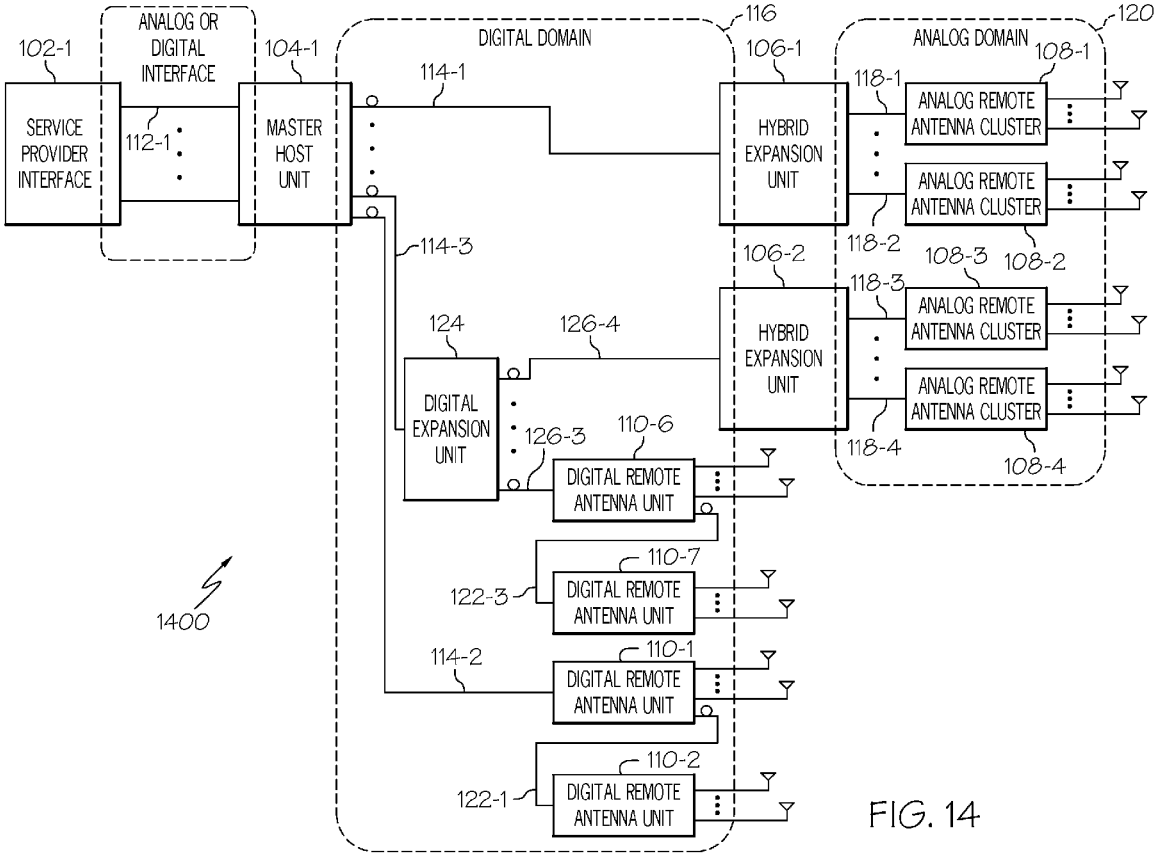
FIG. 14 is a block diagram of another embodiment of a system for providing wireless coverage into a substantially enclosed environment.

FIG. 14 is a block diagram of another embodiment of a system 1400 for providing wireless coverage into a substantially enclosed environment. The system 1400 includes all of the same components as system 1300 and some additional components from system 900, including service provider interface 102-1, master host unit 104-1, hybrid expansion unit 106-1, hybrid expansion unit 106-2, analog remote antenna cluster 108-1, analog remote antenna cluster 108-2, analog remote antenna cluster 108-3, analog remote antenna cluster 108-4, digital expansion unit 124, digital remote antenna unit 110-1, digital remote antenna unit 110-2, digital remote antenna unit 110-6, and digital remote antenna unit 110-7.

In the embodiments of the systems described above, the various components, including master host unit(s) 104, hybrid expansion unit(s) 106, analog remote antenna cluster(s) 108, digital remote unit(s) 110, and digital expansion unit(s) 124, are shown as separate components. In some other example embodiments, some of these components can be combined into the same physical housing or structure and/or functionality can be ported from one component to another.

What is claimed is:

[1. A communication system, comprising:

a first master host unit adapted to communicate analog signals with at least a first service provider interface using a first set of bands of analog spectrum;

a plurality of digital communication links coupled to the first master host unit, wherein the first master host unit is further adapted to communicate digitized spectrum in first N-bit words over at least a first digital communication link of the plurality of digital communication links and second N-bit words over at least a second digital communication link of the plurality of digital communication links;

the first master host unit further adapted to convert between the first set of bands of analog spectrum and the first N-bit words of digitized spectrum, the first master host unit further adapted to convert between the first set of bands of analog spectrum and the second N-bit words of digitized spectrum;

a first hybrid expansion unit communicatively coupled to the first master host unit by the first digital communication link of the plurality of digital communication links and adapted to communicate the first N-bit words of digitized spectrum with the first master host unit across the first digital communication link, the first hybrid expansion unit further adapted to convert between the first N-bit words of digitized spectrum and a second set of bands of analog spectrum;

a first analog communication link coupled to the first hybrid expansion unit, wherein the first hybrid expansion unit is further adapted to communicate the second set of bands of analog spectrum across the first analog communication link;

a first analog remote antenna unit communicatively coupled to the first hybrid expansion unit by the first analog communication link and adapted to communicate the second set of bands of analog spectrum with the first hybrid expansion unit across the first analog communication link, the first analog remote antenna unit further adapted to transmit and receive first wireless signals over a first plurality of air interfaces;

a first digital remote antenna unit communicatively coupled to the first master host unit by the second digital communication link of the plurality of digital communication links and adapted to communicate the second N-bit words of digitized spectrum with the first master host unit across the second digital communication link, the first digital remote antenna unit further adapted to convert between the second N-bit words of digitized spectrum and a third set of bands of analog spectrum, the first digital remote antenna unit further adapted to transmit and receive second wireless signals over a second plurality of air interfaces; and wherein the first master host unit, the first hybrid expansion unit, the first analog remote antenna unit, and the first digital remote antenna unit are synchronized in time and frequency.]

[2. The system of claim 1, wherein the second set of bands of analog spectrum are at the same frequencies as the first set of bands of analog spectrum.]

[3. The system of claim 1, wherein the first analog remote antenna unit is further adapted to frequency convert the second set of bands of analog spectrum to a fourth set of bands of analog spectrum.]

[4. The system of claim 3, wherein the fourth set of bands of analog spectrum are at the same frequencies as the first set of bands of analog spectrum, and wherein at least a subset of the fourth set of bands of analog spectrum are transmitted and received by the first analog remote antenna unit over the first plurality of air interfaces.]

[5. The system of claim 1, wherein the third set of bands of analog spectrum are at the same frequencies as the first set of bands of analog spectrum.]

[6. The system of claim 1, wherein the first digital remote antenna unit is further adapted to frequency convert the third set of bands of analog spectrum to a fourth set of bands of analog spectrum, wherein the fourth set of bands of analog spectrum are at the same frequencies as the first set of bands of analog spectrum, and wherein at least a subset of the fourth set of bands of analog spectrum are transmitted and received by the first digital remote antenna unit over the second plurality of air interfaces.]

[7. The system of claim 1, wherein the first analog remote antenna unit is part of a first analog remote antenna cluster that includes:

a master analog remote antenna unit adapted to communicate the second set of bands of analog spectrum with the first hybrid expansion unit across the first analog communication link;

a second analog remote antenna unit adapted to transmit and receive third wireless signals over a third plurality of air interfaces; and wherein the master analog remote antenna unit distributes a first subset of the second set of bands of analog spectrum to the first analog remote antenna unit and a second subset of the second set of bands of analog spectrum to the second analog remote antenna unit.]

[8. The system of claim 1, wherein the first digital remote antenna unit includes:

at least one module adapted to convert between at least a portion of the second N-bit words of digitized spectrum and a third set of bands of analog spectrum.]

[9. The system of claim 1, further comprising:

a first digital expansion unit communicatively coupled to the first master host unit by a third digital communication link of the plurality of digital communication links and adapted to communicate third N-bit words of digitized spectrum with the first master host unit across the third digital communication link;

a first digital expansion communication link coupled to the first digital expansion unit, wherein the first digital expansion unit is further adapted to communicate at least a portion of the third N-bit words of digitized spectrum across the first digital expansion communication link; and a second digital remote antenna unit communicatively coupled to the first digital expansion unit by the first digital expansion communication link and adapted to communicate the at least a portion of the third N-bit words of digitized spectrum with the first digital expansion unit across the first digital expansion communication link, the second digital remote antenna unit further adapted to convert between the at least a portion of the third N-bit words of digitized spectrum and a fourth set of bands of analog spectrum, the second digital remote antenna unit further adapted to transmit and receive third wireless signals over a third plurality of air interfaces.]

[10. The system of claim 1, further comprising:

a first digital expansion unit communicatively coupled to the first master host unit by a third digital communication link of the plurality of digital communication links and adapted to communicate third N-bit words of digitized spectrum with the first master host unit across the third digital communication link;

a first digital expansion communication link coupled to the first digital expansion unit, wherein the first digital expansion unit is further adapted to communicate at least a portion of the third N-bit words of digitized spectrum across the first digital expansion communication link;

a second hybrid expansion unit communicatively coupled to the first digital expansion unit by the first digital expansion communication link and adapted to communicate the at least a portion of the third N-bit words of digitized spectrum with the first digital expansion unit across the first digital expansion communication link, the second hybrid expansion unit further adapted to convert between the at least a portion of the third N-bit words of digitized spectrum and a fourth set of bands of analog spectrum;

a second analog communication link coupled to the second hybrid expansion unit, wherein the second hybrid expansion unit is further adapted to communicate the fourth set of bands of analog spectrum across the second analog communication link; and a second analog remote antenna unit communicatively coupled to the second hybrid expansion unit by the second analog communication link and adapted to communicate the fourth set of bands of analog spectrum with the second hybrid expansion unit across the second analog communication link, the second analog remote antenna unit further adapted to transmit and receive third wireless signals over a third plurality of air interfaces.]

[11. The system of claim 1, further comprising:

a second master host unit adapted to communicate analog signals with at least a second service provider interface using a fourth set of bands of analog spectrum;

a second plurality of digital communication links coupled to the second master host unit, wherein the second master host unit is further adapted to communicate digitized spectrum in third N-bit words of digitized spectrum over the second plurality of digital communication links;

the second master host unit further adapted to convert between the fourth set of bands of analog spectrum and the third N-bit words of digitized spectrum;

wherein the first hybrid expansion unit is communicatively coupled to the second master host unit by one of the second plurality of digital communication links and adapted to communicate the third N-bit words of digitized spectrum with the second master host unit across the one of the second plurality of digital communication links; and wherein the first hybrid expansion unit multiplexes the third N-bit words of digitized spectrum into the first N-bit words of digitized spectrum before converting between the first N-bit words of digitized spectrum and the second set of bands of analog spectrum.]

[12. The system of claim 1, further comprising:

a first digital expansion unit communicatively coupled to the first master host unit by a third digital communication link of the plurality of digital communication links and adapted to communicate third N-bit words of digitized spectrum with the first master host unit across the third digital communication link;

a second master host unit adapted to communicate analog signals with at least a second service provider interface using a fourth set of bands of analog spectrum;

a second plurality of digital communication links coupled to the second master host unit, wherein the second master host unit is further adapted to communicate digitized spectrum in fourth N-bit words of digitized spectrum over the second plurality of digital communication links;

the second master host unit further adapted to convert between the fourth set of bands of analog spectrum and the fourth N-bit words of digitized spectrum;

wherein the first digital expansion unit is communicatively coupled to the second master host unit by one of the second plurality of digital communication links and adapted to communicate the fourth N-bit words of digitized spectrum with the second master host unit across the one of the second plurality of digital communication links;

wherein the first digital expansion unit multiplexes the third N-bit words of digitized spectrum and the fourth N-bit words of digitized spectrum into fifth N-bit words of digitized spectrum; and a first digital expansion communication link coupled to the first digital expansion unit, wherein the first digital expansion unit is further adapted to communicate the fifth N-bit words of digitized spectrum across the first digital expansion communication link.]

[13. The system of claim 12, further comprising:

a second digital remote antenna unit communicatively coupled to the first digital expansion unit by the first digital expansion communication link and adapted to communicate the fifth N-bit words of digitized spectrum with the first digital expansion unit across the first digital expansion communication link, the second digital remote antenna unit further adapted to convert between the fifth N-bit words of digitized spectrum and a fifth set of bands of analog spectrum, the second digital remote antenna unit further adapted to transmit and receive third wireless signals over a third plurality of air interfaces.]

[14. The system of claim 1, further comprising:

wherein the first hybrid expansion unit is further adapted to convert between the first N-bit words of digitized spectrum and a fourth set of bands of analog spectrum;

a second analog communication link coupled to the first hybrid expansion unit, wherein the first hybrid expansion unit is further adapted to communicate the fourth set of bands of analog spectrum across the second analog communication link; and a second analog remote antenna unit communicatively coupled to the first hybrid expansion unit by the second analog communication link and adapted to communicate the fourth set of bands of analog spectrum with the first hybrid expansion unit across the second analog communication link, the second analog remote antenna unit further adapted to transmit and receive third wireless signals over a third plurality of air interfaces.]

[15. The system of claim 14, wherein at least a portion of the fourth set of bands of analog spectrum is the same as at least a portion of the second set of bands of analog spectrum.]

[16. The system of claim 14, wherein the second analog remote antenna unit is further adapted to frequency convert the second set of bands of analog spectrum to a fifth set of bands of analog spectrum, wherein the fifth set of bands of analog spectrum are at the same frequencies as the first set of bands of analog spectrum, and wherein at least a subset of the fifth set of bands of analog spectrum are transmitted and received by the second analog remote antenna unit over the third plurality of air interfaces.]

[17. The system of claim 1, further comprising:

a first digital remote antenna unit connection link coupled to the first digital remote antenna unit;

a second digital remote antenna unit communicatively coupled to the first digital remote antenna unit by the first digital remote antenna unit connection link and adapted to communicate third N-bit words of digitized spectrum with the first digital remote antenna unit across the first digital remote antenna unit connection link, the second digital remote antenna unit further adapted to convert between the third N-bit words of digitized spectrum and a fourth set of bands of analog spectrum, the second digital remote antenna unit further adapted to transmit and receive third wireless signals over a third plurality of air interfaces.]

[18. The system of claim 17, wherein at least a portion of the second N-bit words of digitized spectrum is the same as at least a portion of the third N-bit words of digitized spectrum.]

[19. The system of claim 1, further comprising:

a second hybrid expansion unit communicatively coupled to the first master host unit by a third digital communication link of the plurality of digital communication links and adapted to communicate third N-bit words of digitized spectrum with the first master host unit across the third digital communication link, the second hybrid expansion unit further adapted to convert between the third N-bit words of digitized spectrum and a fourth set of bands of analog spectrum;

a second analog communication link coupled to the second hybrid expansion unit, wherein the second hybrid expansion unit is further adapted to communicate the fourth set of bands of analog spectrum across the second analog communication link;

a second analog remote antenna unit communicatively coupled to the second hybrid expansion unit by the second analog communication link and adapted to communicate the fourth set of bands of analog spectrum with the second hybrid expansion unit across the second analog communication link, the second analog remote antenna unit adapted to transmit and receive third wireless signals over a third plurality of air interfaces.]

[20. The system of claim 19, wherein the second analog remote antenna unit is further adapted to frequency convert the fourth set of bands of analog spectrum to a fifth set of bands of analog spectrum.]

[21. The system of claim 20, wherein the fifth set of bands of analog spectrum are at the same frequencies as the first set of bands of analog spectrum, and wherein at least a subset of the fifth set of bands of analog spectrum are transmitted and received by the second analog remote antenna unit over the third plurality of air interfaces.]

[22. A method comprising:

converting first wireless spectrum for a first wireless service between a first band of analog spectrum and a first stream of N-bit words of digitized spectrum at a first master host unit;

converting second wireless spectrum for a second wireless service between a second band of analog spectrum and a second stream of N-bit words of digitized spectrum at the first master host unit;

in the downstream direction, multiplexing at least the first stream of N-bit words of digitized spectrum with the second stream of N-bit words of digitized spectrum into a first multiplexed stream at the first master host unit; and multiplexing at least the first stream of N-bit words of digitized spectrum with the second stream of N-bit words of digitized spectrum into a second multiplexed stream at the first master host unit;

transporting the first multiplexed stream of wireless spectrum on a first digital communication link between the first master host unit and a hybrid expansion unit;

converting the first multiplexed stream of wireless spectrum between N-bit words of digitized spectrum and a third set of bands of analog spectrum at the hybrid expansion unit;

transporting the third set of bands of analog spectrum on a first analog communication link between the hybrid expansion unit and a first analog remote antenna unit;

communicating at least a portion of one of the first wireless spectrum and the second wireless spectrum across at least a first air interface at the first analog remote antenna unit;

transporting the second multiplexed stream of wireless spectrum on a second digital communication link between the first master host unit and a first digital remote antenna unit;

converting the second multiplexed stream of wireless spectrum between N-bit words of digitized spectrum and a fourth set of bands of analog spectrum at the first digital remote antenna unit;

communicating at least a portion of one of the first wireless spectrum and the second wireless spectrum across at least a second air interface at the first digital remote antenna unit; and synchronizing the first master host unit, the first hybrid expansion unit, the first analog remote antenna unit, and the first digital remote antenna unit in time and frequency.]

[23. The method of claim 22, further comprising:

in the upstream direction, demultiplexing the first multiplexed stream into at least the first stream of N-bit words of digitized spectrum and the second stream of N-bit words of digitized spectrum at the first master host unit; and demultiplexing the second multiplexed stream into at least the first stream of N-bit words of digitized spectrum and the second stream of N-bit words of digitized spectrum at the first master host unit.]

[24. The method of claim 22, further comprising:

in the downstream direction, multiplexing at least the first stream of N-bit words of digitized spectrum with the second stream of N-bit words of digitized spectrum into a third multiplexed stream at the first master host unit;

transporting the third multiplexed stream of wireless spectrum on a third digital communication link between the first master host unit and a first digital expansion unit;

transporting the third multiplexed stream of wireless spectrum on a first digital expansion communication link between the first digital expansion unit and a second digital remote antenna unit;

converting the third multiplexed stream of wireless spectrum between N-bit words of digitized spectrum and a fifth set of bands of analog spectrum at the second digital remote antenna unit; and communicating at least a portion of one of the first wireless spectrum and the second wireless spectrum across at least a third air interface at the second digital remote antenna unit.]

[25. The method of claim 24, further comprising:

in the upstream direction, demultiplexing the third multiplexed stream into at least the first stream of N-bit words of digitized spectrum and the second stream of N-bit words of digitized spectrum at the first master host unit.]

[26. The method of claim 22, wherein converting the first multiplexed stream of wireless spectrum between N-bit words of digitized spectrum and a third set of bands of analog spectrum at the hybrid expansion unit includes at least one of:

in the downstream, demultiplexing the first multiplexed stream of wireless spectrum into first component parts;

converting the demultiplexed first component parts from N-bit words of digitized spectrum to analog spectrum; and multiplexing the first component parts together into the third set of bands of analog spectrum; and in the upstream, demultiplexing the third set of bands of analog spectrum into second component parts;

converting the demultiplexed second component parts from analog spectrum to N-bit words of digitized spectrum and multiplexing the second component parts together into the first multiplexed stream of wireless spectrum.]

[27. The method of claim 22, wherein converting the second multiplexed stream of wireless spectrum between N-bit words of digitized spectrum and fourth set of bands of analog spectrum at the first digital remote antenna unit includes at least one of:

in the downstream, demultiplexing the second multiplexed stream of wireless spectrum into first component parts;

converting the demultiplexed first component parts from N-bit words of digitized spectrum to analog spectrum and multiplexing the first component parts together into the fourth set of bands of analog spectrum and in the upstream, demultiplexing the fourth set of bands of analog spectrum into second component parts;

converting the demultiplexed second component parts from analog spectrum to N-bit words of digitized spectrum; and multiplexing the second component parts together into the second multiplexed stream of wireless spectrum.]

[28. The method of claim 22, wherein transporting the first multiplexed stream of wireless spectrum on a first digital communication link between the first master host unit and a hybrid expansion unit includes:

converting the first multiplexed stream of wireless spectrum between an electrical signal and an optical signal; and wherein the first digital communication link includes at least one optical communication medium.]

[29. The method of claim 22, wherein transporting the second multiplexed stream of wireless spectrum on a second digital communication link between the first master host unit and the first digital remote antenna unit includes:

converting the second multiplexed stream of wireless spectrum between an electrical signal and an optical signal; and wherein the second digital communication link includes at least one optical communication medium.]

[30. A communication system, comprising:

a first master host unit adapted to communicate analog signals with at least a first service provider interface using a first set of bands of analog spectrum;

a plurality of digital communication links coupled to the first master host unit, wherein the first master host unit is further adapted to communicate digitized spectrum in first N-bit words over the plurality of digital communication links;

the first master host unit further adapted to convert between the first set of bands of analog spectrum and the first N-bit words of digitized spectrum;

a first hybrid expansion unit communicatively coupled to the first master host unit by a first digital communication link of the plurality of digital communication links and adapted to communicate the first N-bit words of digitized spectrum with the first master host unit across the first digital communication link, the first hybrid expansion unit further adapted to convert between the first N-bit words of digitized spectrum and a second set of bands of analog spectrum;

a first analog communication link coupled to the first hybrid expansion unit, wherein the first hybrid expansion unit is further adapted to communicate the second set of bands of analog spectrum across the first analog communication link;

a first analog remote antenna unit communicatively coupled to the first hybrid expansion unit by the first analog communication link and adapted to communicate the second set of bands of analog spectrum with the first hybrid expansion unit across the first analog communication link, the first analog remote antenna unit further adapted to transmit and receive first wireless signals over a first plurality of air interfaces;

a first digital expansion unit communicatively coupled to the first master host unit by a second digital communication link of the plurality of digital communication links and adapted to communicate second N-bit words of digitized spectrum with the first master host unit across the second digital communication link;

a first digital expansion communication link coupled to the first digital expansion unit, wherein the first digital expansion unit is further adapted to communicate the second N-bit words of digitized spectrum across the first digital expansion communication link;

a first digital remote antenna unit communicatively coupled to the first digital expansion unit by the first digital expansion communication link and adapted to convert between the second N-bit words of digitized spectrum and a third set of bands of analog spectrum, the first digital remote antenna unit adapted to transmit and receive second wireless signals over a second plurality of air interfaces; and wherein the first master host unit, the first hybrid expansion unit, the first analog remote antenna unit, the first digital expansion unit, and the first digital remote antenna unit are synchronized in time and frequency.]

[31. The system of claim 30, wherein the second set of bands of analog spectrum are at the same frequencies as the first set of bands of analog spectrum.]

[32. The system of claim 30, wherein the first analog remote antenna unit is further adapted to frequency convert the second set of bands of analog spectrum to a fourth set of bands of analog spectrum.]

[33. The system of claim 32, wherein the fourth set of bands of analog spectrum are at the same frequencies as the first set of bands of analog spectrum, and wherein at least a subset of the fourth set of bands of analog spectrum are transmitted and received by the first analog remote antenna unit over the first plurality of air interfaces.]

[34. The system of claim 30, wherein the third set of bands of analog spectrum are at the same frequencies as the first set of bands of analog spectrum.]

[35. The system of claim 30, wherein the first digital remote antenna unit is further adapted to frequency convert the third set of bands of analog spectrum to a fourth set of bands of analog spectrum, wherein the fourth set of bands of analog spectrum are at the same frequencies as the first set of bands of analog spectrum, and wherein at least a subset of the fourth set of bands of analog spectrum are transmitted and received by the first digital remote antenna unit over the second plurality of air interfaces.]

[36. The system of claim 30, wherein the first analog remote antenna unit is part of a first analog remote antenna cluster that includes:

a master analog remote antenna unit adapted to communicate the second set of bands of analog spectrum with the first hybrid expansion unit across the first analog communication link;

a second analog remote antenna unit adapted to transmit and receive third wireless signals over a third plurality of air interfaces; and wherein the master analog remote antenna unit distributes a first subset of the second set of bands of analog spectrum to the first analog remote antenna unit and a second subset of the second set of bands of analog spectrum to the second analog remote antenna unit.]

[37. The system of claim 30, wherein the first digital remote antenna unit further includes:

at least one module adapted to convert between at least a portion of the second N-bit words of digitized spectrum and a third set of bands of analog spectrum.]

[38. The system of claim 30, further comprising:

a second master host unit adapted to communicate analog signals with at least a second service provider interface using a fourth set of bands of analog spectrum;

a second plurality of digital communication links coupled to the second master host unit, wherein the second master host unit is further adapted to communicate digitized spectrum in third N-bit words of digitized spectrum over the second plurality of digital communication links;

the second master host unit further adapted to convert between the fourth set of bands of analog spectrum and the third N-bit words of digitized spectrum; and wherein the first digital expansion unit is communicatively coupled to the second master host unit by one of the second plurality of digital communication links and adapted to communicate the third N-bit words of digitized spectrum with the first master host unit across the one of the second plurality of digital communication links; and wherein the first digital expansion unit multiplexes the second N-bit words of digitized spectrum and the third N-bit words of digitized spectrum into fourth N-bit words of digitized spectrum; and a first digital expansion communication link coupled to the first digital expansion unit, wherein the first digital expansion unit is further adapted to communicate the fourth N-bit words of digitized spectrum across the first digital expansion communication link.]

[39. The communication system of claim 30, further comprising:

a second digital expansion communication link coupled to the first digital expansion unit, wherein the first digital expansion unit is further adapted to communicate third N-bit words of digitized spectrum across the second digital expansion communication link;

a second hybrid expansion unit communicatively coupled to the first digital expansion unit by the second digital expansion communication link and adapted to communicate the third N-bit words of digitized spectrum with the first digital expansion unit across the second digital expansion communication link, the second hybrid expansion unit further adapted to convert between the third N-bit words of digitized spectrum and a fourth set of bands of analog spectrum; and a second analog communication link coupled to the second hybrid expansion unit, wherein the second hybrid expansion unit is further adapted to communicate the fourth set of bands of analog spectrum across the second analog communication link.]

[40. The communication system of claim 39, further comprising:

a second analog remote antenna unit communicatively coupled to the second hybrid expansion unit by the second analog communication link and adapted to communicate the fourth set of bands of analog spectrum with the second hybrid expansion unit across the second analog communication link, the second analog remote antenna unit further adapted to transmit and receive third wireless signals over a third plurality of air interfaces.]

[41. A communication system, comprising:

a first master host unit adapted to communicate analog signals with at least a first service provider interface using a first set of bands of analog spectrum;

a first digital communication link coupled to the first master host unit, wherein the first master host unit is further adapted to communicate digitized spectrum in first N-bit words over the first digital communication link;

the first master host unit further adapted to convert between the first set of bands of analog spectrum and the first N-bit words of digitized spectrum;

a first digital expansion unit communicatively coupled to the first master host unit by the first digital communication link and adapted to communicate the first N-bit words of digitized spectrum with the first master host unit across the first digital communication link;

a first digital expansion communication link coupled to the first digital expansion unit, wherein the first digital expansion unit is further adapted to communicate digitized spectrum in second N-bit words across the first digital expansion communication link;

a first hybrid expansion unit communicatively coupled to the first digital expansion unit by the first digital expansion communication link of the plurality of digital expansion communication links and adapted to communicate the second N-bit words of digitized spectrum with the first digital expansion unit across the first digital expansion communication link, the first hybrid expansion unit adapted to convert between the second N-bit words of digitized spectrum and a second set of bands of analog spectrum;

a first analog communication link coupled to the first hybrid expansion unit, wherein the first hybrid expansion unit is further adapted to communicate the second set of bands of analog spectrum across the first analog communication link;

a first analog remote antenna unit communicatively coupled to the first hybrid expansion unit by the first analog communication link and adapted to communicate the second set of bands of analog spectrum with the first hybrid expansion unit across the first analog communication link, the first analog remote antenna unit further adapted to transmit and receive first wireless signals over a first plurality of air interfaces; and wherein the first master host unit, the first digital expansion unit, the first hybrid expansion unit, the first analog remote antenna unit, and the first digital remote antenna unit are synchronized in time and frequency.]

[42. The system of claim 41, wherein at least a portion of the first N-bit words is the same as at least a portion of the second N-bit words.]

[43. The system of claim 41, further comprising:

a second digital expansion communication link coupled to the first digital expansion unit, wherein the first digital expansion unit is further adapted to communicate digitized spectrum in third N-bit words across the second digital expansion communication link; and a first digital remote antenna unit communicatively coupled to the first digital expansion unit by the second digital expansion communication link of the plurality of digital expansion communication links and adapted to convert between the third N-bit words of digitized spectrum and a third set of bands of analog spectrum, the first digital remote antenna unit adapted to transmit and receive second wireless signals over a second plurality of air interfaces.]

[44. The system of claim 43, wherein at least a portion of the first N-bit words is the same as at least a portion of the third N-bit words.]

[45. The system of claim 1, wherein at least a portion of the second N-bit words is the same as at least a portion of the first N-bit words.]

[46. The system of claim 1, wherein the first analog communication link includes a wired analog communication medium.]

[47. The system of claim 1, wherein the first digital communication link includes a wired digital communication medium.]

[48. The system of claim 1, wherein the second digital communication link includes a wired digital communication medium.]

[49. The system of claim 1, further comprising:

a second master host unit adapted to communicate analog signals with at least a second service provider interface using a fourth set of bands of analog spectrum;

a second plurality of digital communication links coupled to the second master host unit, wherein the second master host unit is further adapted to communicate digitized spectrum in third N-bit words of digitized spectrum over the second plurality of digital communication links;

the second master host unit further adapted to convert between the fourth set of bands of analog spectrum and the third N-bit words of digitized spectrum;

wherein the first hybrid expansion unit is communicatively coupled to the second master host unit by one of the second plurality of digital communication links and adapted to communicate the third N-bit words of digitized spectrum with the second master host unit across the one of the second plurality of digital communication links; and wherein the first hybrid expansion unit multiplexes the third N-bit words of digitized spectrum into the first N-bit words of digitized spectrum before converting between the first N-bit words of digitized spectrum and the second set of bands of analog spectrum.]

[50. The system of claim 1, further comprising:

a second master host unit adapted to communicate analog signals with at least a second service provider interface using a fourth set of bands of analog spectrum;

a second plurality of digital communication links coupled to the second master host unit, wherein the second master host unit is further adapted to communicate digitized spectrum in third N-bit words of digitized spectrum over the second plurality of digital communication links;

the second master host unit further adapted to convert between the fourth set of bands of analog spectrum and the third N-bit words of digitized spectrum; and wherein the first digital remote antenna unit is communicatively coupled to the second master host unit by one of the second plurality of digital communication links and adapted to communicate the third N-bit words of digitized spectrum with the second master host unit across the one of the second plurality of digital communication links.]

[51. The method of claim 22, wherein at least a portion of the second stream of N-bit words is the same as at least a portion of the first stream of N-bit words.]

[52. The method of claim 22, wherein the first analog communication link includes a wired analog communication medium.]

[53. The system of claim 30, wherein at least a portion of the second N-bit words is the same as at least a portion of the first N-bit words.]

[54. The system of claim 30, wherein the first analog communication link includes a wired analog communication medium.]

[55. The system of claim 30, wherein the first digital communication link includes a first wired digital communication medium;

wherein the second digital communication link includes a second wired digital communication medium; and wherein the first digital expansion communication link includes a wired digital communication medium.]

[56. The system of claim 41, wherein at least a portion of the second N-bit words is the same as at least a portion of the first N-bit words.]

[57. The system of claim 41, wherein the first analog communication link includes a wired analog communication medium.]

[58. The system of claim 41, wherein the first digital communication link includes a first wired digital communication medium;

wherein the second digital communication link includes a second wired digital communication medium; and wherein the first digital expansion communication link includes a wired digital communication medium.]

[59. A communication system, comprising:

a first master host unit adapted to communicate analog signals with at least a first service provider interface using a first set of bands of analog spectrum;

a plurality of digital communication links coupled to the first master host unit, wherein the first master host unit is further adapted to communicate digitized spectrum in first N-bit words over at least a first digital communication link of the plurality of digital communication links and second N-bit words over at least a second digital communication link of the plurality of digital communication links;

the first master host unit further adapted to convert between the first set of bands of analog spectrum and the first N-bit words of digitized spectrum, the first master host unit further adapted to convert between the first set of bands of analog spectrum and the second N-bit words of digitized spectrum;

a first hybrid expansion unit communicatively coupled to the first master host unit by the first digital communication link of the plurality of digital communication links and adapted to communicate the first N-bit words of digitized spectrum with the first master host unit across the first digital communication link, the first hybrid expansion unit further adapted to convert between the first N-bit words of digitized spectrum and a second set of bands of analog spectrum;

a first analog communication link coupled to the first hybrid expansion unit, wherein the first hybrid expansion unit is further adapted to communicate the second set of bands of analog spectrum across the first analog communication link;

a first analog remote antenna unit communicatively coupled to the first hybrid expansion unit by the first analog communication link and adapted to communicate the second set of bands of analog spectrum with the first hybrid expansion unit across the first analog communication link, the first analog remote antenna unit further adapted to transmit and receive first wireless signals over a first plurality of air interfaces;

a first digital remote antenna unit communicatively coupled to the first master host unit by the second digital communication link of the plurality of digital communication links and adapted to communicate the second N-bit words of digitized spectrum with the first master host unit across the second digital communication link, the first digital remote antenna unit further adapted to convert between the second N-bit words of digitized spectrum and a third set of bands of analog spectrum, the first digital remote antenna unit further adapted to transmit and receive second wireless signals over a second plurality of air interfaces; and wherein a common reference clock is distributed to wherein the first master host unit, the first hybrid expansion unit, the first analog remote antenna unit, and the first digital remote antenna unit.]

[60. The system of claim 59, wherein at least a portion of the second N-bit words is the same as at least a portion of the first N-bit words.]

[61. A method comprising:

converting first wireless spectrum for a first wireless service between a first band of analog spectrum and a first stream of N-bit words of digitized spectrum at a first master host unit;

converting second wireless spectrum for a second wireless service between a second band of analog spectrum and a second stream of N-bit words of digitized spectrum at the first master host unit;

in the downstream direction, multiplexing at least the first stream of N-bit words of digitized spectrum with the second stream of N-bit words of digitized spectrum into a first multiplexed stream at the first master host unit; and multiplexing at least the first stream of N-bit words of digitized spectrum with the second stream of N-bit words of digitized spectrum into a second multiplexed stream at the first master host unit;

transporting the first multiplexed stream of wireless spectrum on a first digital communication link between the first master host unit and a hybrid expansion unit;

converting the first multiplexed stream of wireless spectrum between N-bit words of digitized spectrum and a third set of bands of analog spectrum at the hybrid expansion unit;

transporting the third set of bands of analog spectrum on a first analog communication link between the hybrid expansion unit and a first analog remote antenna unit;

communicating at least a portion of one of the first wireless spectrum and the second wireless spectrum across at least a first air interface at the first analog remote antenna unit;

transporting the second multiplexed stream of wireless spectrum on a second digital communication link between the first master host unit and a first digital remote antenna unit;

converting the second multiplexed stream of wireless spectrum between N-bit words of digitized spectrum and a fourth set of bands of analog spectrum at the first digital remote antenna unit;

communicating at least a portion of one of the first wireless spectrum and the second wireless spectrum across at least a second air interface at the first digital remote antenna unit; and distributing a common reference clock to the first master host unit, the first hybrid expansion unit, the first analog remote antenna unit, and the first digital remote antenna unit.]

[62. The method of claim 61, wherein at least a portion of the second N-bit words is the same as at least a portion of the first N-bit words.]

*63. A communication system, comprising:*

*a master host unit configured to generate digital data;*

*a digital remote unit communicatively coupled to the master host unit and configured to receive digital data from the master host unit;*

*a hybrid expansion unit communicatively coupled to the master host unit and configured to receive digital data from the master host unit, wherein the hybrid expansion unit is further configured to convert the digital data received from the master host unit into analog signals;*

*at least one analog remote antenna unit remotely located from and communicatively coupled to the hybrid expansion unit, wherein the at least one analog remote antenna unit is configured to receive the analog signals from the hybrid expansion unit and to transmit analog radio frequency signals wirelessly using at least one antenna; and*

*wherein the communication system is configured so that all conversion of the digital data generated by the master host unit into any respective analog signals occurring in the communication system is synchronized in time and frequency.*

*64. The communication system of claim 63, wherein the at least one analog remote antenna unit includes a plurality of remote antenna units.*

*65. The communication system of claim 64, wherein the at least one analog remote antenna unit includes a cluster of analog remote antenna units having a master analog remote antenna unit and a plurality of slave analog remote antenna units.*

*66. The communication system of claim 63, wherein the analog signals include at least one intermediate frequency signal.*

*67. The communication system of claim 63, wherein the at least one remote antenna unit is configured to receive the analog signals from the hybrid expansion unit across at least one of: at least one coaxial cable, at least one twisted pair wire, at least one CATV fiber, or at least one optical fiber.*

*68. The communication system of claim 63, wherein the at least one analog remote antenna unit is configured to:*

*convert the analog signals from the hybrid expansion unit into the analog radio frequency signals.*

*69. The communication system of claim 63, wherein the at least one remote antenna unit is configured to:*

*transmit the analog radio frequency signals wirelessly to at least one mobile device over at least one air interface using the at least one antenna.*

*70. A communication system, comprising:*

*a first unit having first circuitry configured to generate digital data;*

*a second unit having second circuitry, the second unit communicatively coupled to the first unit, the second circuitry configured to receive digital data from the first unit;*

*a third unit having third circuitry, the third unit communicatively coupled to the first unit, the third circuitry configured to:*

*receive digital data from the first unit; and*

*convert the digital data received from the first unit into analog signals;*

*at least one fourth unit having fourth circuitry, the at least one fourth unit remotely located from and communicatively coupled to the third unit, the fourth circuitry configured to:*

*receive the analog signals from the third unit; and*

*transmit analog radio frequency signals wirelessly using at least one antenna; and*

*wherein the communication system is configured so that all conversion of the digital data generated by the first unit into any respective analog signals occurring in the communication system is synchronized in time and frequency.*

*71. The communication system of claim 70, wherein the at least one fourth unit includes a plurality of fourth units.*

*72. The communication system of claim 71, wherein the at least one fourth unit includes a cluster of analog remote antenna units having a master analog remote antenna unit and a plurality of slave analog remote antenna units.*

*73. The communication system of claim 70, wherein the analog signals include at least one intermediate frequency signal.*

*74. The communication system of claim 70, wherein the fourth circuitry is configured to receive the analog signals from the third unit across at least one of: at least one coaxial cable, at least one twisted pair wire, at least one CATV fiber, or at least one optical fiber.*

*75. The communication system of claim 70, wherein the fourth circuitry is configured to:*

*transmit the analog radio frequency signals wirelessly to at least one mobile device over at least one air interface using the at least one antenna.*

*76. A method, comprising:*

*generating digital data at a master host unit of a communication system, the communication system configured so that all conversion of the digital data generated by the master host unit into any respective analog signals occurring in the communication system is synchronized in time and frequency;*

*receiving digital data from the master host unit at a digital remote unit of the communication system;*

*receiving digital data at a hybrid expansion unit of a communication system;*

*converting the digital data received from the master host unit into analog signals;*

*receiving the analog signals from the hybrid expansion unit at at least one analog remote antenna unit remotely located from and communicatively coupled to the hybrid expansion unit; and*

*transmitting analog radio frequency signals wirelessly from the at least one analog remote antenna unit using at least one antenna.*

*77. The method of claim 76, wherein the at least one analog remote antenna unit includes a plurality of remote antenna units.*

*78. The method of claim 77, wherein the at least one analog remote antenna unit includes a cluster of analog remote antenna units having a master analog remote antenna unit and a plurality of slave analog remote antenna units.*

*79. The method of claim 76, wherein the analog signals include at least one intermediate frequency signal.*

*80. The method of claim 76, further comprising:*

*receiving the analog signals from the hybrid expansion unit at the at least one remote antenna unit across at least one of: at least one coaxial cable, at least one twisted pair wire, at least one CATV fiber, or at least one optical fiber.*

*81. The method of claim 76, further comprising:*

*converting the analog signals from the hybrid expansion unit into the analog radio frequency signals at the at least one analog remote antenna unit.*

*82. The method of claim 76, further comprising:*

*transmitting the analog radio frequency signals wirelessly from the at least one analog remote antenna unit to at least one mobile device using the at least one antenna over at least one air interface.*

* * * * *